US007231135B2

(12) United States Patent
Esenyan et al.

(10) Patent No.: US 7,231,135 B2
(45) Date of Patent: Jun. 12, 2007

(54) COMPUTER-BASED VIDEO RECORDING AND MANAGEMENT SYSTEM FOR MEDICAL DIAGNOSTIC EQUIPMENT

(75) Inventors: Hayk Esenyan, Orangeburg, NY (US); Richard W. Francis, Orangeburg, NY (US)

(73) Assignee: Pentax of American, Inc., Montvale, NJ (US)

( * ) Notice: Subject to any disclaimer, the term of this patent is extended or adjusted under 35 U.S.C. 154(b) by 1233 days.

(21) Appl. No.: 09/987,872

(22) Filed: Nov. 16, 2001

(65) Prior Publication Data

US 2002/0172498 A1    Nov. 21, 2002

Related U.S. Application Data

(60) Provisional application No. 60/291,638, filed on May 18, 2001.

(51) Int. Cl.
*H04N 5/91* (2006.01)
*H04N 5/00* (2006.01)
*H04N 7/18* (2006.01)
*A61B 1/00* (2006.01)

(52) U.S. Cl. .................. 386/95; 386/117; 348/65; 348/74; 600/101

(58) Field of Classification Search ............... None
See application file for complete search history.

(56) References Cited

U.S. PATENT DOCUMENTS 4,802,018 A    1/1989  Tanikawa et al.
5,029,016 A    7/1991  Hiyama et al.
5,111,306 A    5/1992  Kanno et al.
5,124,789 A    6/1992  Hiyama et al.
6,081,675 A    6/2000  Mogamiya et al.
6,184,922 B1   2/2001  Saito et al.
6,514,207 B2 * 2/2003  Ebadollahi et al. ......... 600/450
6,938,029 B1 * 8/2005  Tien ............................ 707/1

* cited by examiner

*Primary Examiner*—Thai Q. Tran
*Assistant Examiner*—Heather R. Jones
(74) *Attorney, Agent, or Firm*—Greenblum & Bernstein, P.L.C.

(57) ABSTRACT

A computer-based video recording and management system is provided which is used in conjunction with medical diagnostic equipment. The system allows a physician or medical personnel to record and time-mark significant events during a medical procedure on video footage, to index patient data with the video footage, and then to later edit or access the video footage with patient data from a database in an efficient manner. The system includes at least one input device that inserts a time-mark into the video footage; and a workstation that associates an index with each time-mark, extracts a portion of the video footage at the time-mark beginning just before and ending just after the time-mark, concatenates the portion of the video footage with other portions of video footage, into a shortened summary video clip, and stores both the video footage and summary video clip into a searchable database.

30 Claims, 24 Drawing Sheets

Instrumentation Diagram

*MPS System Diagram*

MPS Main Module M8

Initialization of MPS Window

MPS Recording Mode Initialization

User Interaction Processing (MPS Recording Mode)

*Single Frame Capture Process*

*Video Recording On Process*

*Video Recording OFF Process*

Live Video ON Process

Live Video OFF Process

*User Interaction Processing (MPS Playback Mode)*

*MPS Multi-Media Player Module M9*

MPS Multi-Media Player User Controls

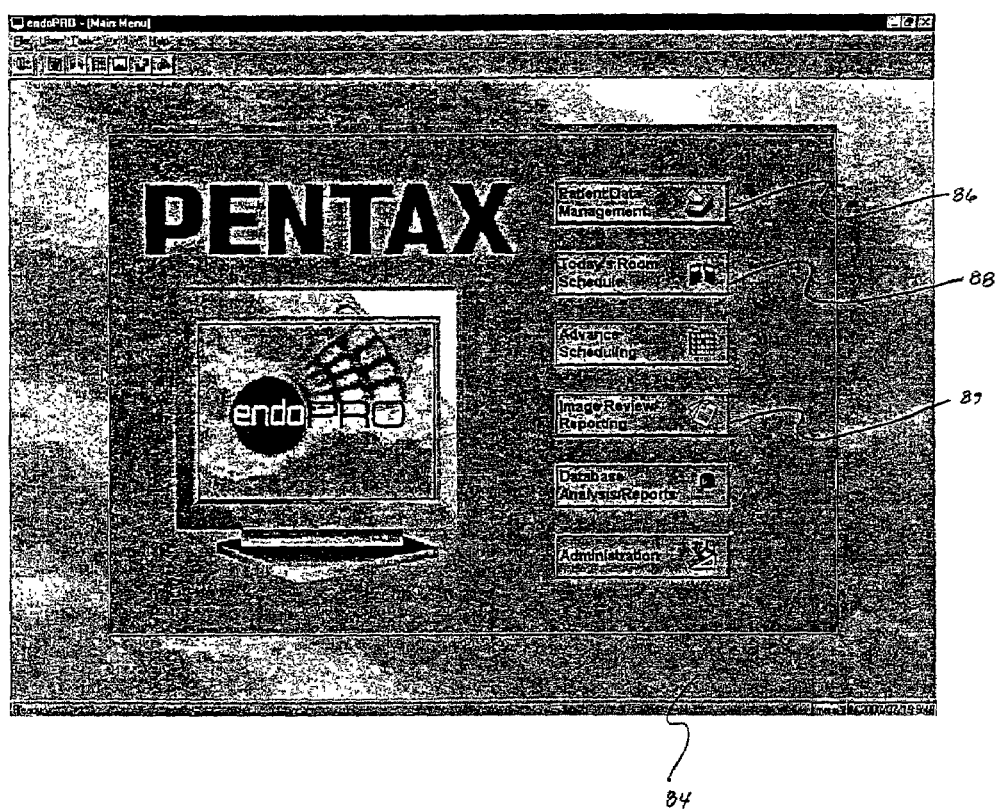
*Figure 15 -ENDOPRO Main Menu (Prior Art)*

Figure 16 - Today's Room Schedule

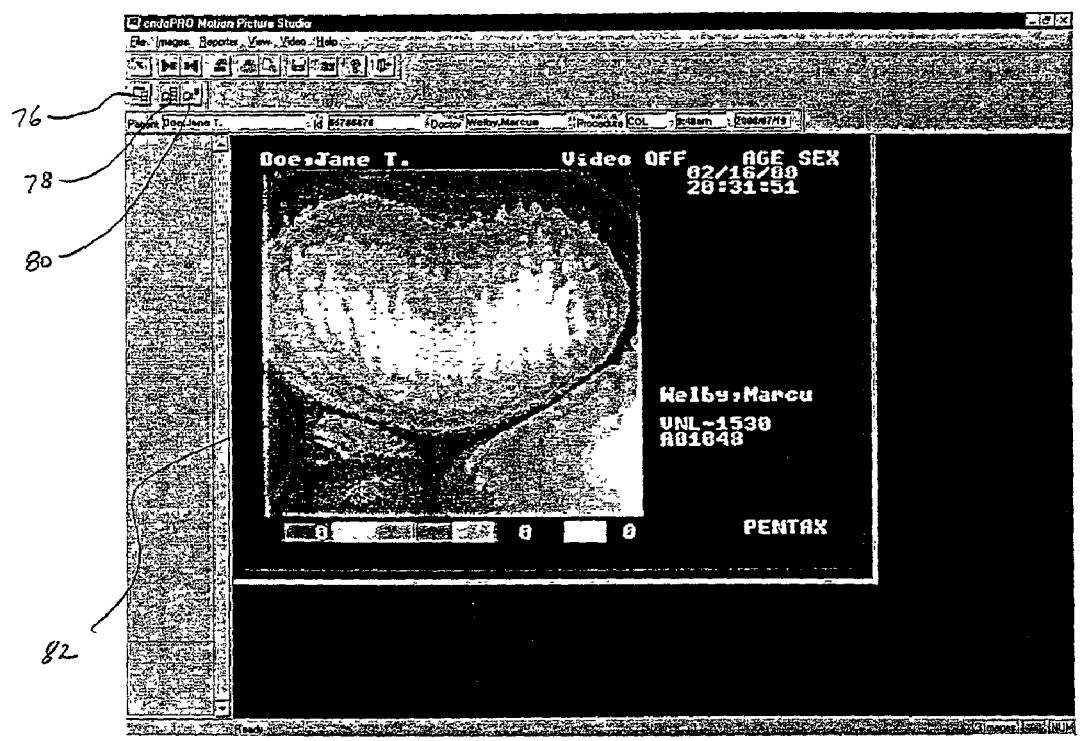
Figure 17 - MPS Main Screen

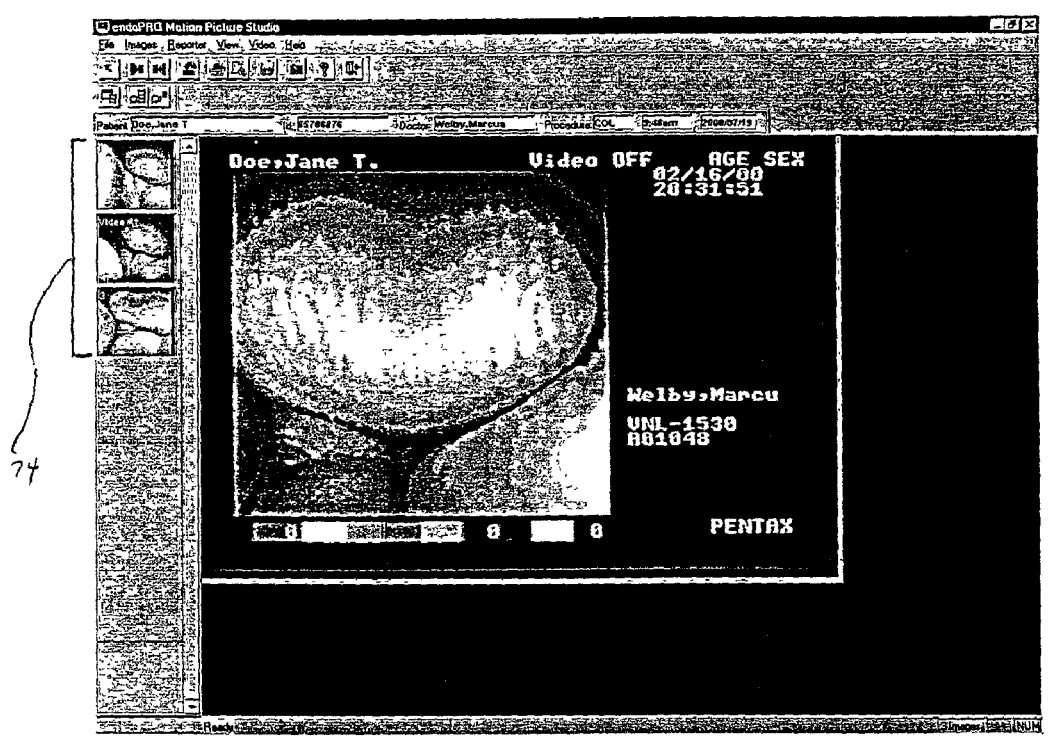
*Figure 18- Thumbnail (Image) bar with captured still and video images.*

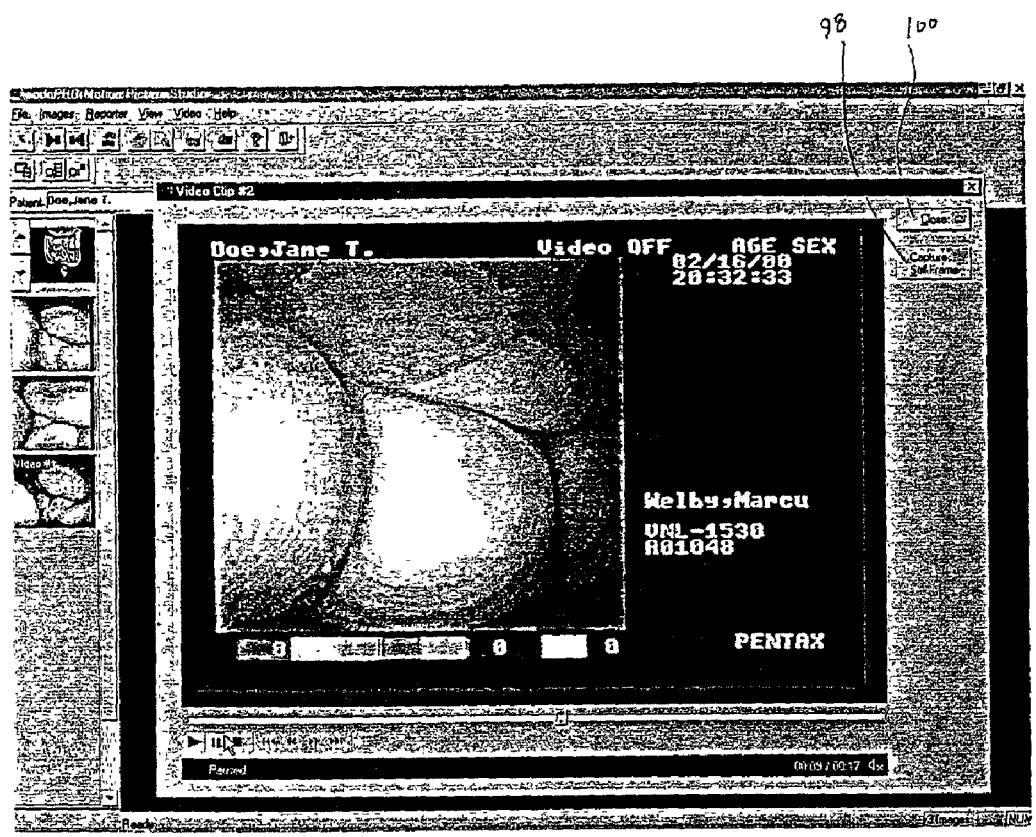
Figure 19 - Video Clip Viewer

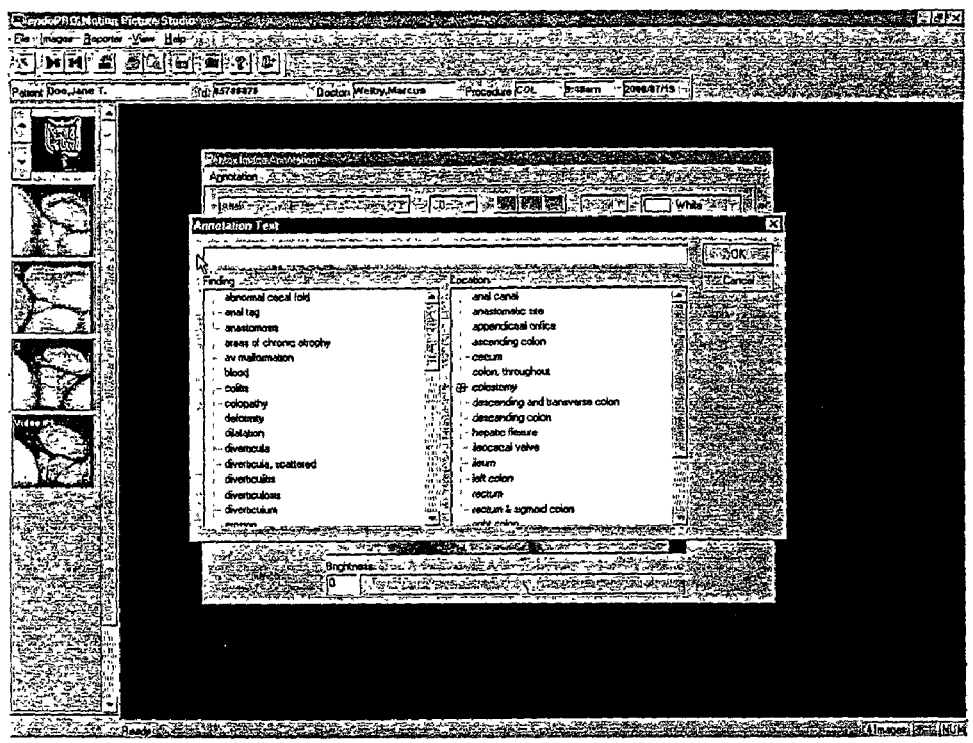
Figure 20- Annotation Text Window

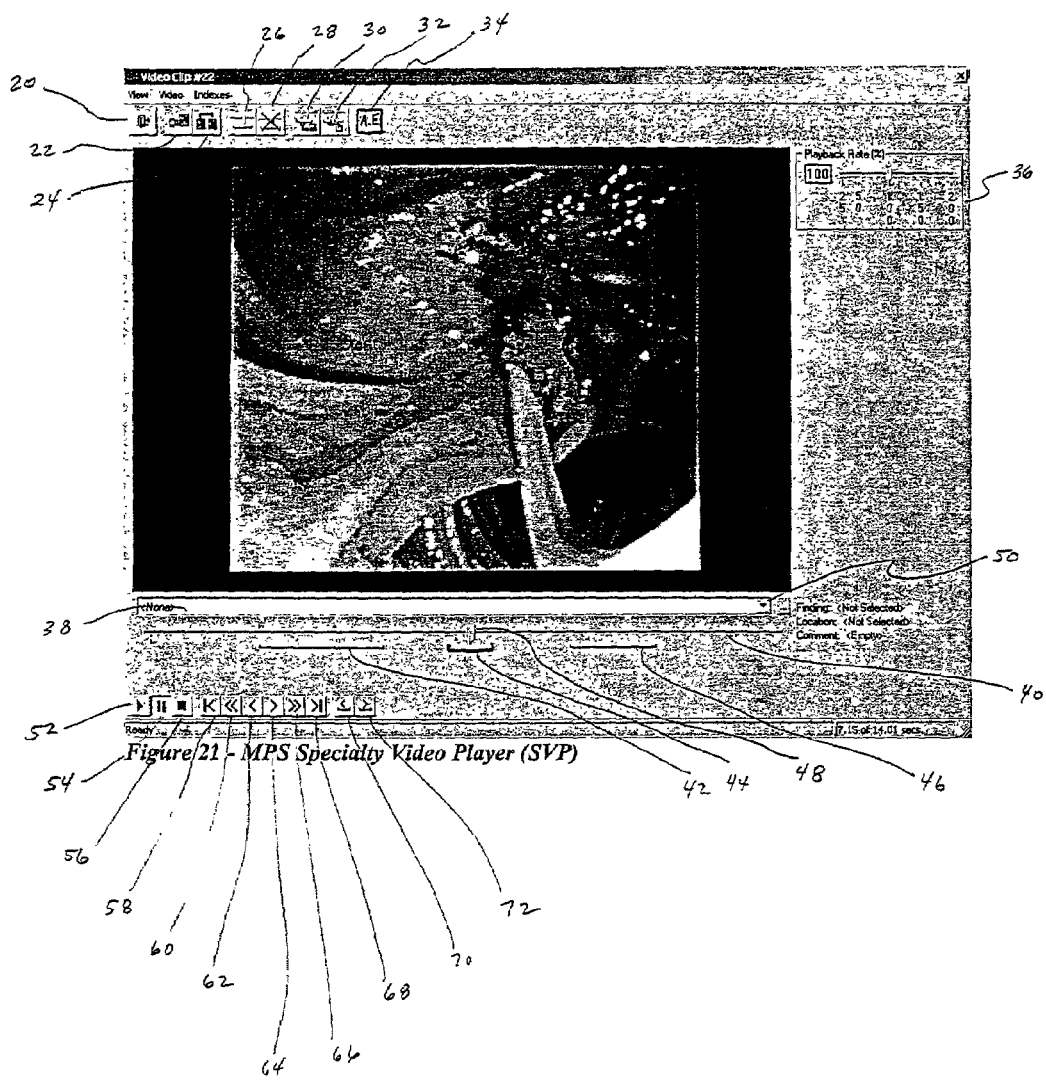
Figure 21 – MPS Specialty Video Player (SVP)

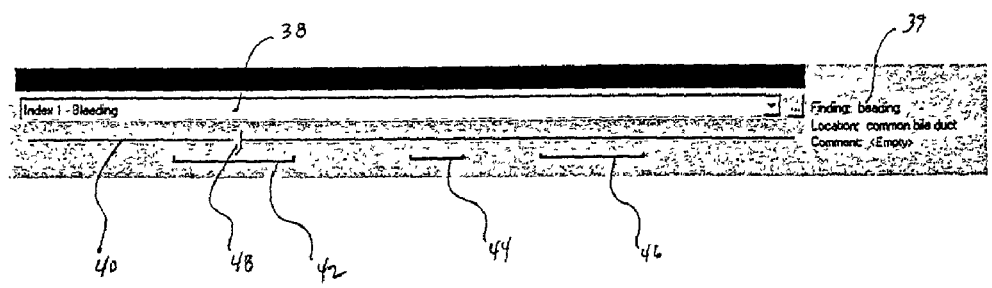
Figure 22 - Time line, slider, index zones, index selector, index data box
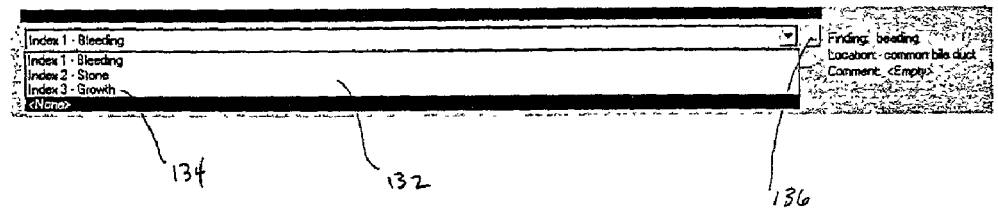
Figure 23 - Use of index selector

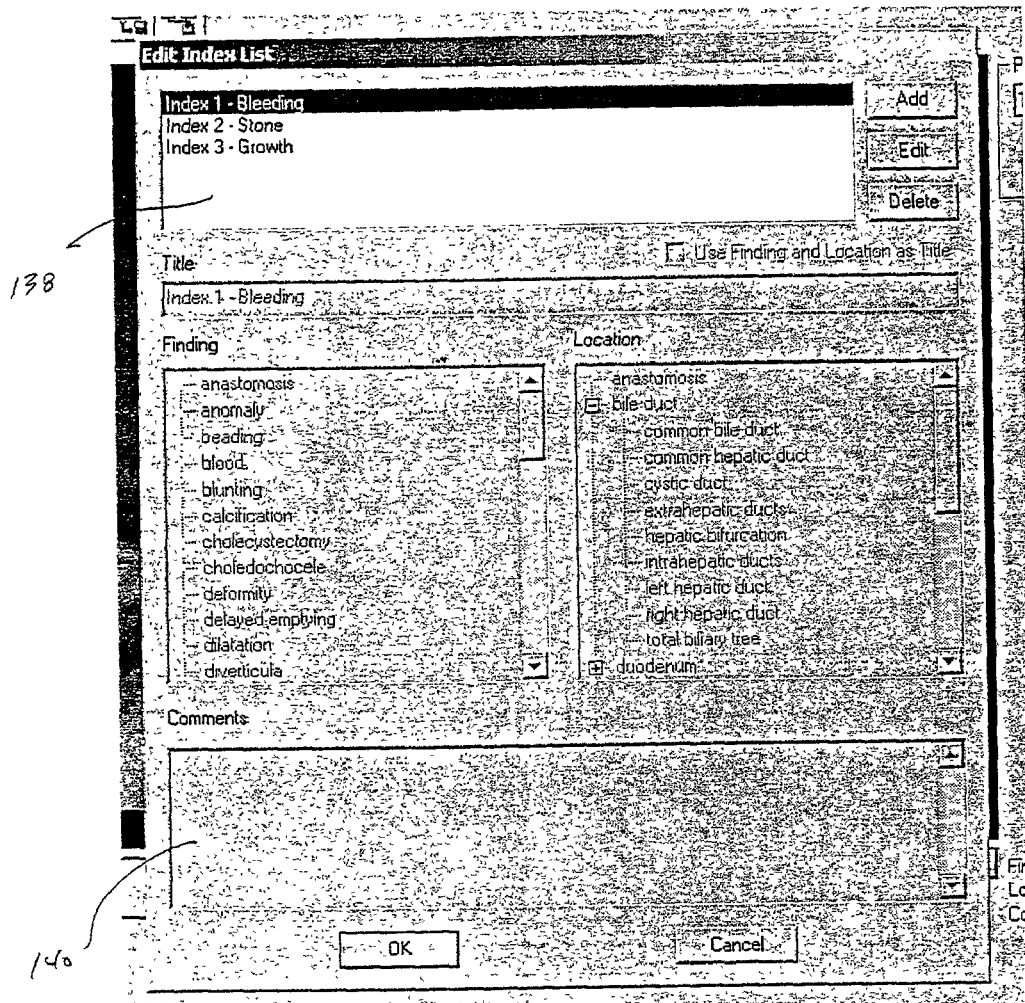
FIGURE 24 - INDEX MANAGEMENT WINDOW

Instrumentation Diagram

Packet Transmission from UDI to VCU

Packet Transmission from VCU to UDI

COMPUTER-BASED VIDEO RECORDING AND MANAGEMENT SYSTEM FOR MEDICAL DIAGNOSTIC EQUIPMENT

CROSS-REFERENCE TO RELATED APPLICATION

The present application claims the benefit of Provisional Application No. 60/291,638 under 35 U.S.C. § 119(e) to H. Esenyan et al., filed on May 18, 2001, the disclosure of which is expressly incorporated by reference herein in its entirety.

BACKGROUND OF THE INVENTION

1. Field of the Invention

The present invention is related to a computer-based video recording and management system, which is used in conjunction with medical diagnostic equipment. In particular, the system allows a physician or medical personnel to record and time-mark significant events during a medical procedure, to index patient data with the video footage, and then to later edit and/or access the video footage with patient data from a database in an efficient and accurate manner.

2. Discussion of Background Information

An endoscope is an instrument which is formed from a flexible tube which can be inserted inside the human body through natural openings such as the mouth, the nose, etc. The endoscope allows the physician performing a medical examination to visually observe the state of natural body cavities such as the throat, esophagus, stomach, pancreatic and biliary ducts, colon, etc.

Typically, during a medical procedure in which a physician uses an endoscope, he/she can press buttons on the endoscope to capture still images of the most relevant portions of the procedure. These images can then be stored into a computerized system. The computerized system will associate each picture taken during the procedure with the patient's records. In particular, during the procedure, the endoscope user simply presses a button on the scope and an associated computer system captures the images. The system saves the images into a database containing the patient's medical records. As a result, the system allows one, after the endoscopic procedure is complete for instance, to assimilate and analyze the data so that a medical report can be generated.

Following the endoscopic examination, the physician reviews all the medical data generated throughout the procedure and issues a report. The medical report normally includes text and images. For example, a textual description and diagnosis of what the physician found during the procedure (i.e. malignancies, polyps, etc.) is always included in the medical report. Furthermore, images can be included to pictorially illustrate the medical condition of which the physician is actually referring to in the textual description.

Still imaging systems for endoscopes have been available for several years. For example, U.S. Pat. No. 5,111,306 to Kanno et al. teaches an endoscope image filing apparatus wherein endoscope image information and search information are recorded in the same medium by a recording apparatus.

U.S. Pat. No. 5,124,789 to Hiyama et al. discloses a system including multiple image signal generating apparatuses which each generate an image signal using an electronic endoscope, an ultrasonic scope or the like. The scopes are connected to a common large capacity filing apparatus through an interface so that image data can be recorded together with image information with respect to the data in the unit of any number of images for a single examination. The image data recorded can then be searched for in the unit of a single examination.

As endoscope technology progresses, video endoscopes have been developed which generate live images on a video monitors by capturing the visual information using an electronic sensor placed at the distal end of the endoscope. Video taping an entire endoscopic procedure is also well-known. For instance, the entire endoscopic procedure, from beginning to end, can be recorded on a VCR in the procedure room. Such video recordings have been traditionally used only for specific reasons, such as presentational, educational or training purposes, etc.

An example is provided in U.S. Pat. No. 6,184,922 to Saito et al., in which a camera control unit for processing a signal output from an imaging device incorporated in an endoscope is taught. The system includes an analog video signal output terminal through which a video signal is output to a monitor, and a digital video signal output terminal to which a still image-specific or motion picture-specific expansion unit is coupled in a freely detachable manner By handling a release switch, a still image or motion picture can be recorded digitally.

However, none of the above-noted references provide features which allow for the video footage to be incorporated or combined with important patient data such as name, medical finding, finding location, and free text to be associated with each video clip. Furthermore, none of the above-noted references provide features which allow for storage of the video with patient data, so that it can be easily edited and/or stored in a database.

One of the main reasons video has not been incorporated into the patient's records is because of system constraints (e.g., computer memory). Another reason is because of the extensive amount of time required to edit the video and to incorporate the video into the patient's records. Whether the editing is performed on a VCR editing machine or on a computer system with video editing capabilities, it requires an extensive amount of time, which in turn, increases medical costs.

Typically, the medical staff has higher priorities during the medical procedure than editing the video of the procedure in real-time. Furthermore, such procedures are often unpredictable. Because one does not know what may occur or be discovered during the procedure, it is somewhat imprudent to selectively record only phenomena of which is expected to be of significant interest during the procedure. For instance, during the procedure of unexpected problem may occur, and later full documentation will suddenly become very important and relevant. Therefore, traditionally, if a video clip of the procedure is desired, one must initially record the entire procedure.

Depending upon the medical procedure, the video recording time can be anywhere between ten minutes to two and one-half hours for each procedure. Once the procedure is finished and the medical staff has a better perspective of the results of the operation, it is then normally a more appropriate time to edit the video.

It is becoming increasingly more important to provide systems in which critical data can be extracted from medical devices and then organized in an efficient and effective manner. Currently in medical database research, if one tries to carry out a visual search of medical investigations, often the databases do not have enough materials to accurately implement a complete search. Many medical databases are incomplete and only have random bits and pieces of medical data. When research is being conducted, often the researcher does not know why certain procedures have been recorded.

Ultimately, when conclusions are drawn from statistical research, the conclusions drawn are only as good as the data in the database. Therefore, in order to perform any kind of statistical research based on a database, a need exists for ensuring that the database is significantly populated in a systematic way.

SUMMARY OF THE INVENTION

An aspect of the present invention is to provide a computer-based video picture recording and management system for medical diagnostic equipment (hereinafter referred to as "motion picture studio" or "MPS system"). In particular, the disclosed MPS system features techniques, which allow the physician and medical staff to record video clips during an endoscopic procedure while simultaneously marking significant events, to include important patient data with each video clip, and then to later edit the video clips with great efficiency and accuracy.

The present invention provides many distinct advantages over the traditional manner of recording video during a medical procedure. First, the present invention offers the advantage of significantly reducing editing time for developing a patient's medical report. It eliminates the need for handling video cassettes, DVD's or memory cards because all the video data is electronically and directly stored into the memory of the MPS system.

A second major advantage of the present invention is a feature that immediately associates the video clips with the patient's current medical procedure record. Traditionally, this would require labeling and proper archival of a videocassette. Not only is such a procedure time consuming, but also the storage of a videocassette for each individual patient becomes a problem. More storage space required for each patient's records equates to higher medical costs.

Furthermore, as a result of the underlying digital video recording technology, the present invention offers a greater quality video playback on a computer screen compared to the quality offered by a VCR. This is especially true when the user desires to pause on a specific view, in which case the present invention continues to display a clear high quality view based upon digital technology, whereas the VCR offers at best a blurry picture with multiple horizontal blanking lines.

Another aspect of the present invention is that the MPS system has been designed to be integrated with medical instruments which provide a video source from a variety of devices. For example, the MPS system is also capable of being integrated with medical instruments used in ultrasound, fluoroscopy, x-ray, and/or surgical cameras.

The present invention also offers additional benefits due to its ability to be integrated with currently available video endoscopic instrumentation, such as the line of products manufactured by Pentax Corp. For instance, the MPS system is designed to be tightly integrated with a variety of Pentax video processors and a variety of Pentax video endoscopes.

The present invention also provides indexing capability for time-marks and their associated useful segments. In one embodiment, the index includes a title, a finding, a location and free text of unlimited length. The index information comes into view during playback of the video footage while the focus is within the time span of the useful segment associated with the indexed time-mark. Through existing "ENDOPRO" software developed and marketed by Pentax Corp. and advancements to the ENDOPRO software package disclosed herewith, it is now possible to search and locate specific video clips that relate to a certain findings, locations, and free-text criteria.

Another aspect of the present invention relates to a feature referred to as "Auto-Editing" or "Auto-Editor". This feature allows one to expediently produce a summary output of the entire video. It allows one to reduce a two to three hour video down to a two to three minute "Executive Summary Video" which focuses only on the most significant events during the procedure in a matter of seconds. The "Auto-Editing" is a software function which can be performed after the procedure is complete. Therefore, editing time or production time to produce a medical report with still pictures or video is decreased dramatically.

Another aspect of the present invention provides a very systematic tool in order to compile, edit or correct video information so that the medical information having significance can be input into a database. Such feature allows an increased efficiency in medical research due to the fact that information about medical conditions can be assimilated in a much more effective and efficient manner. Thus, medical research should be improved because the compilation of medical data will be immediately organized so that it is easily accessible.

Furthermore, once the information is assimilated, the MPS system allows one to easily transfer the data into databases so that expedient searching may be performed. Therefore, not only is the editing time or production time required to produce a medical report with still pictures or video decreased dramatically, but the invention allows for efficient assimilation and storing of data so it can be searched more effectively.

According to an aspect of the present invention, a computer readable medium storing a computer program that provides a computer-based video recording and management system for medical procedures is provided. The medium includes a source code segment that inserts at least one time-mark into video footage upon receiving input from a user, the at least one time-mark capable of being inserted into the video footage real-time while the video footage is being recorded and post procedure during review; and a source code segment that associates an index with the at least one time-mark, data capable of being input into the index real-time during a medical procedure and post-procedure during review.

According to another aspect of the present invention the index includes data for at least one of a patient's name, medical finding, finding location, and free text. In yet another aspect of the invention, the data is transmitted from at least one of a medical instrument, microphone, footpedal/switch, mouse and computer keyboard operated by a user of the system.

In another aspect of the present invention, a source code segment is provided that extracts at least one portion of the video footage starting at a predetermined period of time before the at least one time-mark and ending at a predetermined period of time after the at least one time-mark. According to a further aspect of the present invention, the at least one portion of video footage is concatenated with at least another portion of video footage into a shortened summary video clip.

According to a further aspect of the present invention, a computer readable medium storing a computer program is provided that enables recording and time-marking of significant events during a medical procedure in video footage, indexing patient data with the video footage, and then editing and accessing the video footage with patient data and diagnostic information from a database in an efficient and expedient manner. The medium includes a source code segment that inserts at least one time-mark into the video footage; a source code segment that associates an index with the at least one time-mark; a source code segment that extracts at least one portion of the video footage at the at least one time-mark, wherein the at least one portion begins before the at least one time-mark and ends after the at least one time-mark; a source code segment that concatenates the extracted at least one portion of video footage together with at least another portion of video footage into a shortened summary video clip; and a source code segment that stores, both the video footage and shortened summary video clip with associated indices, into a searchable database.

In another aspect of the present invention, a source code segment is provided that maintains and updates at least one patient's medical record with at least one of data from the index, video footage, and still pictures from the medical procedure. According to a still further aspect of the present invention, the index includes data fields for at least one of a name, medical finding, finding location, and free text. Other aspects of the present invention include wherein data for the index is capable of being input real-time during a medical procedure and post-procedure during review.

Further aspects of the present invention include wherein the time-mark is inserted according to a user input device. According to other aspects of the present invention include wherein the time-mark is capable of being real-time during a medical procedure and post-procedure during review. According to another aspect of the invention, the user is notified whether the insertion of the at least one time-mark was successful or failed, by displaying a message on a monitor.

According to still a further aspect of the present invention, a source code segment is provided which includes a specialty video player. According to another aspect of the present invention, the specialty video player includes a playback speed control which provides for playback speeds ranging from a reduced speed to an accelerated speed as compared to a normal speed. In yet another aspect of the present invention, a source code segment is provided that enables jumping backward to a previous time-mark or jumping forward to a next time-mark.

According to a further aspect of the present invention, a source code segment is included that provides a capture still image feature which stores a still picture within at least one patient's medical record. In another aspect of the present invention, a source code segment is included that provides a create marker and delete marker feature which allows for the creation and deletion of the at least one time-marker within the video footage. According to a still further aspect of the present invention, a source code segment is included which provides a voice activated data entry system allowing data to be entered via voice.

Furthermore, according to another aspect of the present invention, a computer-based video recording and management system is provided. It is used in conjunction with medical diagnostic equipment, which allows recording and time-marking of significant events during a medical procedure on video footage, indexing patient data with the video footage, and then editing or access the video footage with patient data from a database in an efficient manner. The system includes at least one input device that inserts at least one time-mark into the video footage; and at least one workstation that associates an index with each time-mark, extracts at least a portion of the video footage at the at least one time-mark beginning before and ending after the at least one time-mark, concatenates the at least one portion of the video footage with at least another portion of video footage into a shortened summary video clip, and stores both the video footage and summary video clip into a searchable database.

In another aspect of the present invention, the at least one input device includes a medical instrument having a video source, the video source being connected to the at least one workstation. According to a still further aspect of the present invention, the at least one workstation maintains at least one patient's medical record. According to another aspect of the present invention, the index includes data fields for at least one of a name, medical finding, finding location, and free text.

According to a still further aspect of the present invention, data for the index is capable of being input real-time during a medical procedure and post-procedure during a review period. Other aspects of the invention include wherein the at least one workstation is connected to a network. Furthermore, other aspects of the present invention include wherein the at least one workstation is connected to the network via an Internet connection. According to other aspects of the present invention, at least one file server having a video storage array is connected to the network which stores at least one patient's medical record.

According to other aspects of the present invention, the medical instrument includes an endoscope. According to another aspect of the present invention, the medical instrument includes one of an ultrasound device, flouroscopy device, x-ray device and surgical camera. According to a further aspect of the present invention, the input device includes a foot pedal/switch, microphone, mouse, and computer keyboard.

Additionally, other aspects of the present invention include wherein when the input device is activated, the system encapsulates data with the video footage for indexing purposes In yet another aspect of the present invention, the network includes a peer-to-peer network. And in another aspect of the present invention, the database is located in one of the at least one workstation and the at least one file server.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted drawings by way of non-limiting examples of exemplary embodiments of the present invention, in which like reference numerals represent similar parts throughout the several views of the drawings, and wherein:

FIG. 15 is a screen shot of the prior art ENDOPRO Main Menu according to an aspect of the present invention;

FIG. 16 is an exemplary screen shot of the Today's Room Schedule screen with the Adding Patient/Procedure window open according to an aspect of the present invention;

FIG. 17 is an exemplary screen shot of the MPS Main Screen according to an aspect of the present invention;

FIG. 18 is an exemplary screen shot the MPS Main Screen having the thumbnail bar displayed with captured still and video images according to an aspect of the present invention;

FIG. 19 is an exemplary screen shot the Video Clip Viewer according to an aspect of the present invention;

FIG. 20 is an exemplary screen shot of the Annotation Text window according to an aspect of the present invention;

FIG. 21 is an exemplary screen shot of the MPS Specialty Video Player (SVP) displaying the Playback Window according to an aspect of the present invention;

FIG. 22 depicts an exemplary time line, index zones, index selector, and index data box according to an aspect of the present invention;

FIG. 23 depicts an exemplary use of the index selector according to an aspect of the present invention.

FIG. 24 is an exemplary screen shot of the Index Table Management window according to an aspect of the present invention;

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
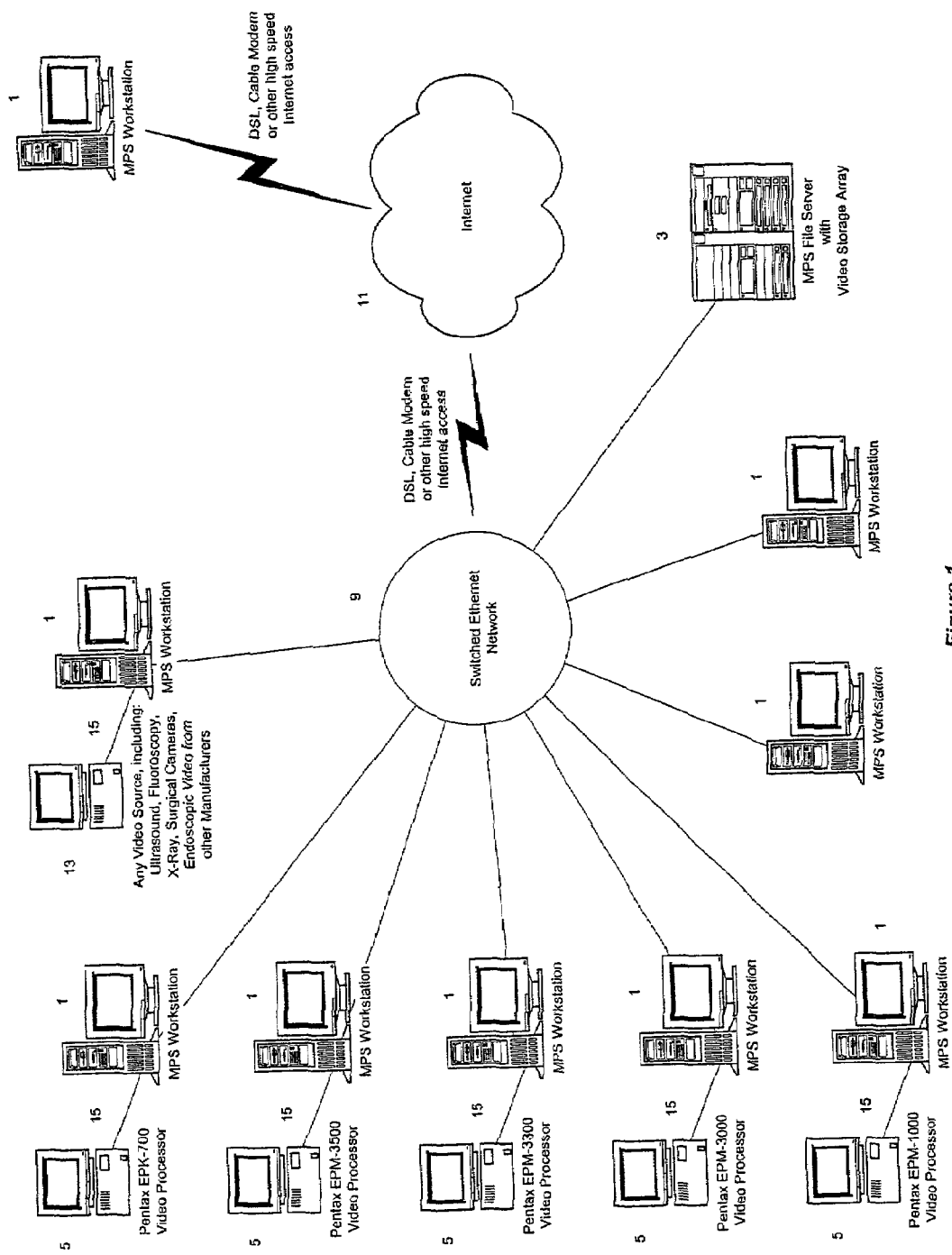
FIG. 1 is a system diagram of an embodiment of the present invention in which several MPS workstations are networked together with an MPS file server and video storage array.

A. MPS System Overview:

FIG. 1 is a system diagram which depicts an embodiment of the MPS system. This embodiment includes a variety of video processors 5 and video sources 13 each connected to a MPS workstation 1. The MPS workstations are connected to a switched Ethernet network 9. Also connected to the Ethernet network 9 is a MPS file server 3 which has a video storage array. As shown in FIG. 1, a MPS workstation 1 can also be connected to the Ethernet network 9 via DSL, cable modem or any other high-speed Internet access 11.

The data line 15 connecting the video processing or source equipment to the MPS workstation is a logical connection commonly referred to as an "ENDONET Connection" which is a product manufactured by Pentax Corp. The ENDONET Connection includes a video connection per RGBS, S-VIDEO, NTSC, or DV standards, which transmits the visual information generated by the video source to the MPS workstation 1. The ENDONET Connection may also include a bi-directional or mono-directional data communication line per the RS232C or other standards such as USB or TCP/IP, which essentially carries patient or procedure related information from the MPS workstation 1 to video source 13 and/or processor 5, and receives image capture, or video recording requests from video source 13 and/or processor 5 to the MPS workstation 1.

All data transactions between the video source 13 and/or processor 5 and MPS workstation 1 are performed over data line 15 (from FIG. 1) using a data exchange protocol known as the ENDONET Communication Protocol Version 2.21 and also referred to as Dynamic Device Recognition (DDR) Protocol. The DDR Protocol, which is a Pentax product, will be explained in greater detail later in the specification.

Figure 25:
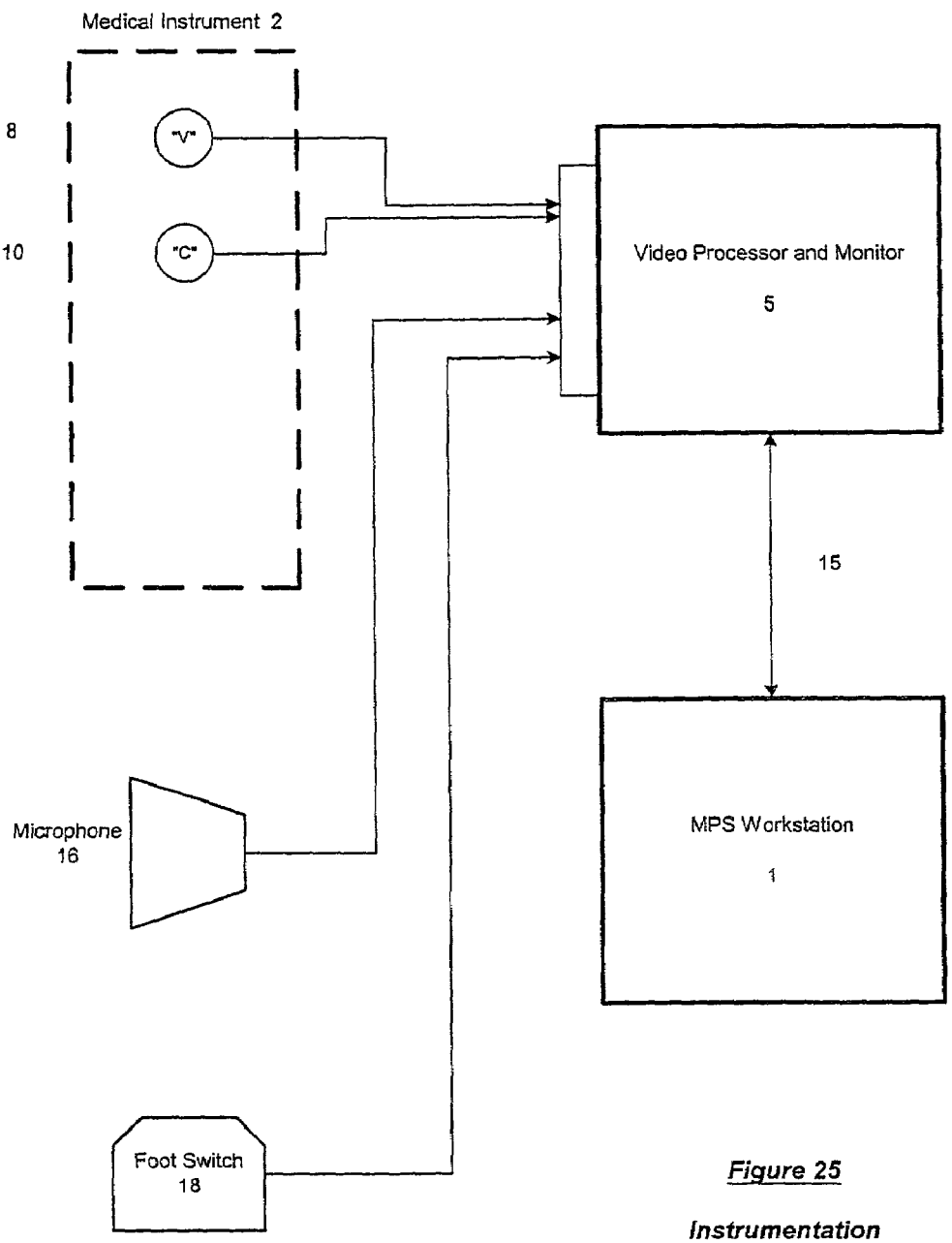
FIG. 25 is an exemplary instrumentation diagram of the endoscope buttons, foot pedal and voice actuated microphone according to an aspect of the present invention.

The MPS system has been designed to be capable of being tightly integrated with readily available video medical instruments 2 (from FIG. 25), such as a line of products manufactured by Pentax Corp. The MPS system is also compatible with a variety of other medical devices such as video gastroscopes, duodenoscopes, colonoscopes, sigmoidoscopes, bronchoscopes, rhino-laryngoscopes, cystoscopes, and choledochoscopes. The medical instruments are, such as a video endoscope, are not illustrated on FIG. 1, but would be connected to the video processors, as shown in FIG. 25.

A exemplary list of endoscopes (and the respective part numbers) compatible with the MPS system and of which Pentax manufactures is as follows:

Video gastroscopes and duodenoscopes include EG-2901/62019, EG3400/62020, EG-3410/62014, EG-2530/62090, EG-2731/62075, EG-2931/62146, EG-3431/62125, EG-3830T/62079, ED-2330/62118, ED-3230/62093, ED-3430/62130, ED-3430T/62061, VSB-3430/62105, EG-1840/62092, EG-2540/62082, EG-2940/62068, EG-3440/62083, EG-3840T/62073, ED-3240/62132, ED-3440/62091, ED-3440T/62062, VSB-3440/62106, EG-2930K/62095, EG-3430K/62145, ED-3430K/62110, ED-3430TK/62147, EG-3631U/62153, EG-2930Q/62099, and EG-3430Z/62124.

Video colonoscopes and sigmoidoscopes include EC-3400L/62003, EC-3801L/62009, EC-3800TL/62006, ES-3801/62025, EC-3430F/62081, EC-3430L/62080, EC-3830F/62089, EC-3831L/62135, EC-3830TL/62065, ES-3831/62157, EC-3440F/62084, EC-3440L/62085, EC-3840F/62070, EC-3840L/62069, EC-3840TL/62067, ES-3840/62071, EC-3430LK/62149, EC-3430FK/62143, EC-3830LK/62096, EC-3830TLK/62151, EC-3830FK/62101, ES-3830K/62097, EC-3430LZ/62159, and EC-3830LZ/62098.

Video bronchoscopes include EB-1530T3/62136 and EB-1830T3/62141. Video rhino-laryngoscopes include VNL-1330/62109 and VNL-1530T/62111. Video cystoscopes include ECY-1530/62116. Video choledochoscopes include ECN-1530/62115.

If the medical instrument 2 to be used with the MPS system is a Pentax product, it will require a video processor 5 which, may also be manufactured by Pentax. For instance, the MPS system can be integrated with the Pentax EPK-700, EPM-3500, EPM-3300, EPM-3000, and EPM-1000 video processors, as illustrated in FIG. 1. The above-noted video processors are connected directly to the MPS workstations 1.

It should be noted that when using the above-mentioned Pentax products, the Pentax endoscope and Pentax video processor 5 are coupled together. As a result, the video source is a function of the video processor 5. Therefore, the Pentax endoscope and Pentax video processor 5 may be considered together as one unit.

The MPS system is also designed with flexibility in mind with respect to compatibility with non-Pentax products. Any other device which provides a standard video output can also be used in conjunction with the MPS system. For instance, the present invention is capable of being integrated with any other video source 13 including ultrasound, fluoroscopy, x-ray, surgical cameras, or endoscopic video from other manufacturers. In this case, a foot pedal/switch 18 could be used to capture the still image or to toggle the video recording on or off. An exemplary MPS foot switch 18, which is also a Pentax product, is part number MPS-FS/FS200.

FIG. 25 depicts a medical instrument 2, for instance a Pentax video endoscope, which may be used in conjunction with a Pentax video processor 5 and MPS workstation 1 to capture video. The button 8 labeled "V" (for video) allows the physician to toggle the video recording process with a single key (video turn ON/OFF). The button 10 labeled "C" (for capture) permits the capture of a single still picture by the computer-based video imaging system, but simultaneously tags the video footage with time-marks in association with the snap-shot captured.

As this operation (i.e., pressing the "C" button to capture a still image) is repeated several times throughout the medical examination, the invention encapsulates within the video footage all necessary information for indexing. This allows the viewer to access during playback the most useful views directly, without having to watch the entire footage.

The time-marks are further used to identify segments of the video footage that are the most useful and worth being kept permanently in the medical report. The MPS software applies a set of predefined rules to construct segments of video which were marked during the procedure. In default mode, the MPS system takes the ten seconds immediately prior to the time-mark and the twenty seconds following the time-mark to identify a "useful segment" within the video footage.

It is important to note that all of the controls of the MPS system are primarily based from software functions. Thus, every peripheral device used in the MPS system is eventually mapped to software buttons, including the buttons 8 and 10, foot switch button 18, mouse input, and keyboard input. In other words, the MPS system architecture is designed in a manner such that all control functions operate from software command sequences and, therefore, are the primary basis for user input with respect to channeling such data signals into the MPS system. On the other hand, buttons 8 and 10 and the foot switch 18 provide signals which mimic the signals of recording controls 76, 78 and 80 (from FIG. 17) and are, therefore, mapped to the same data entry point of which the software based control buttons originate from.

The Playback Window (see FIG. 21) provided in the MPS system offers an additional way to modify the length of a segment, and functions to extract and save one or several segments created in the fashion described above. This technique provides for the reduction of the original video volume to a fraction of the original length while preserving the most relevant and useful material contained within.

Thus, for illustrative purposes only, it can be imagined that the user of the present invention can mark a video recording 4.5 minutes into the procedure, then initiate a second mark at 15 minutes into the procedure, and a third mark 17.3 minutes into the procedure. Once the body of the video material is marked, the user can then make the assumption that the important moments of the procedure are known to be around those shots. Then, the MPS system can be commanded, via the "Auto-Edit" command, to automatically extract a sufficient amount of video to create a summary output video (e.g., ten seconds before and twenty seconds after). This summary video is referred to as the "Executive Summary Video".

In this manner, a two hour video clip can be reduced to a much shorter time, e.g., two to three minutes. The amount of time before and after the snapshots is also adjustable. For instance, the physician can adjust the amount of video that is played depending on his/her preference. Or the physician can choose an auto setting to receive the automatic results that the MPS system produces. In this case, Auto-Editing is performed by the MPS system with absolutely no intervention on the part of the physician. As a result, a two hour video can be reduced to a much shorter amount of video virtually automatically without the intervention of anyone.

Thus, the MPS system has the capability to combine the marked video clips together to create a summary output video and then store it in the patient's records. The user still has the option to keep the original footage, which can be several hours of video, for archival purposes if desired. Depending on the parameters that are set up in the MPS system, the entire footage can be saved just to be on the safe side for reference in the future or it can be deleted to save storage space in the system memory.

Noteworthy features of the MPS system include: (1) an indexing feature, (2) a video database, (3) Auto-Editing capabilities, (4) a Specialty Video Player, (5) a real-time diagnostic information capture feature, (6) a specialty data format feature, and (7) a distributed video storage and management feature. Each of the aforementioned features will be further discussed in greater detail below.

1. Indexing Feature

As described above, the indexing feature provides the MPS system the ability to create markers (or "time-marks")

within the body of video footage and to associate each time-mark with a name, medical finding, finding location, and free text.

During the medical examination, the physician may request the MPS system to capture still images by pressing button 10 (often labeled as "C" for capture) on the handle of the medical instrument, as illustrated in FIG. 25. The indexing can be created in real-time during the performance of the medical examination or post procedure during the review time. When indexing is performed during the procedure, the scope button "C", or a foot pedal/switch 16 is used to create the index. When indexing is performed post procedure, the user can click on a software button 26 (the "Create" marker) displayed on the MPS Playback Window (see FIG. 21).

Each time the "C" button 10. or foot switch 18 is pressed, the request is transmitted to the MPS workstation 1 across the data link 15 described above, and the capture result is sent back to the medical instrument 2 via the same channel. The physician is made of about the outcome of the request by a flashing "CAPTURE OK" or "CAPTURE FAILED" message on the video processor monitor 5.

The physician can also toggle another button 8 on the handle of the medical instrument 2 (often labeled by the letter "V" for video), in order to start and stop the recording of video footage directly into the MPS system. The data communications pertaining to these actions is also transmitted over data line 15 described above, and the physician is provided with feedback indicating that video recording is ON or OFF.

When snap shots are taken while the video recording is ON, the video footage is marked with the exact time when the capture requests were performed. Each time-mark is associated also with an index, which includes informative components such as the medical finding, the location of the finding, and comments in a free text format. These data elements can then be filled in post-procedure, when the physician performs his procedure record review.

2. Video Database

The indexing data generated by the system is stored in a specialty database located in the MPS file server 3 (see FIG. 1), which offers a variety of tools for retrieval of the indexed material and provides instantaneous access to it.

Normally, it can take a long time to accomplish the required editing with a video cassette. For instance, assuming that the video material was originally recorded on a video cassette, that the cassette was properly labeled, and that the physician has an idea with regard to where the relevant view is stored with respect to the time line of the video clip; the physician would have to seek the cassette from storage, insert it in the VCR, start playback, fast forward at high speed, watch the monitor, identify the right sequence, and switch from fast forwarding to normal playback.

On the other hand, the MPS system automatically accomplishes the same result in a matter of a few seconds. Furthermore, the MPS system keeps a consistent link between the video footage and other computerized data elements pertaining to the medical procedure record of the patient.

The MPS database maybe developed from structured query language (SQL). Exemplary database software includes Sybase SQL Anyware Version 5.5.0.4 If the MPS system is a standalone configuration, the SQL database is located on the local workstation. If the MPS system is in a network configuration, the database is located in the MPS file server 3 (see FIG. 1).

With an embodiment as provided in FIG. 1, initially all information recorded during the procedure is stored in the database located in the MPS file server 3, except for still image files and video recordings. The still image files are stored in an "Active Image" subdirectory which is stored on the local MPS workstation 1. With regard to the video footage, only after the video footage has been edited, it is then transferred to MPS file server 3. Otherwise, MPS file server 3 would have to store a tremendous amount of data which is truly not relevant or needed. If not in a network configuration, all information is saved to the local hard disk drive in the individual MPS workstation 1 utilized during the medical procedure.

3. Auto-Editing Capabilities

The Auto-Editing function results from the utilization of several novel features disclosed herein. Initially, the Auto-Editor associates a pre-determined video clip size with each video index. As previously discussed, a video clip starts, e.g., sometimes a few seconds prior to the index mark and ends sometimes, e.g., several seconds past the index mark. The timing in question is typically set to ten seconds before and twenty seconds after the time mark by default, for a resulting clip of thirty seconds per index. However, the default values can be overwritten during review time on a case per case basis, or replaced with new default values according to the user's needs.

The Auto-Editing function utilizes the Specialty Video Player (referred to as "SVP"; discussed in next section; see FIG. 21) to perform its function. The SVP offers the ability to extract the video clips as individual files one at a time or all at once. This feature provides for the ability to extract the most useful portions of the video material.

An additional function offered on the Specialty Video Player to support Auto-Editing is a software button 34 which permits the extraction of all video clips created through automatic or manual indexing and their concatenation into a single output file called the "Executive Summary Video".

Referring to FIG. 21, a time line 40 is provided with a cursor 48. Underneath the time line 40 are three index zones 42, 44, 46 which are representative of the video footage recorded. The Auto-Editor allows one to extract the index zones to create a video output.

Auto-Editing occurs in a series of steps. The first step involves the function of extracting the video clips. In this sense, the video footage is truly only being copied, thus, the original full length video footage is always left intact. Next, the clips are concatenated together in a concise video clip. As seen in FIG. 21, an Auto-Edit button 34 is provided in the upper lefthand corner of the SVP screen.

The transitions from sequence to sequence (clip to clip) within the Executive Summary Video are implemented with fade-in, fade-out type effects so that when viewing the summary clip the user is made aware of the fact that there may be a significant drift in the time line. Furthermore, all indexing information (title of the index, finding, location, and free text) for all markers are included with the Executive Summary Video. The action of creating the summary video is typically left to the decision of the user, but it can also be automated in such a way that without any intervention on the part of the user, the computer can generate it based on default video footage extraction rules provided in the MPS system software.

Auto-Editing also encompasses the choice of disposing of the original full-length video footage. The user is offered several choices, such as discarding it completely right away, or keeping it for a certain amount of time prior to deleting it, or reducing it significantly by applying a compression scheme and transferring to a near on-line long term storage medium such as a DVD disk or like. This last feature is provided to help keep the amount of data stored in the MPS computer memory minimized.

4. Special Video Player

The Specialty Video Player (referred to as SVP; and illustrated in FIG. 26) offers VCR or DVD like functionality, which has been specifically enhanced for use with the indexing and editing techniques described above. It offers all standard features such as Play 52, Pause 54, and Stop 56. It also offers frame-by-frame forwarding 64 and back stepping 62, second-per-second forwarding 68 and back stepping 58.

The SVP indicates all the markers along the video time line 40. Furthermore, it shows all the indexing information (marker, video clip, index title, finding, location, free text) using a "smart display" technique. This technique includes bringing up only the relevant information when needed during playback.

The Specialty Video Player also provides software buttons to perform the following: single frame capture 22, video title frame replacement 24 with currently paused view, saving highlighted clip as a separate video clip 30, saving all clips in individual separate video files 32, and producing a summary video footage 34. The SVP and the operation thereof, will be discussed in much greater detail in a following section of the specification.

5. Real-time Diagnostic Information Capture Feature

The present invention offers two different modalities for entering the diagnostic information into the video index selected based upon on whether the user wants to provide the data during the procedure or post procedure. After the procedure is finished, the physician may elect to use more traditional data entry techniques using the computer keyboard and the attached pointer device (such as a mouse).

The diagnostic information may also be entered via a voice activated recognition data entry system which can be used for the purpose of inputting data immediately during the execution of the medical procedure by issuing verbal commands to the MPS system. As the procedure is performed and the physician decides to take a picture, he can speak into a microphone 16 (i.e., to state a finding or observation, etc.) as shown in FIG. 25, and the MPS system will immediately tag the index with the stated finding and location.

If any voice commands are issued within a short period of time either before or after the marker is created, then the command is related to that marker. For instance, the physician may press "C" button 10 and within seconds speak "finding is polyp in sigmoid colon". MPS creates the new marker and the associated index and parses the voice command, recognizing the finding "polyp" and location "sigmoid colon". It then fills in the data fields. If voice information comes too late or not at all, the fields are left empty so that the physician can fill the fields in later during the review process.

One embodiment of the voice recognition system uses a lapel microphone 16 in order to capture and interpret vocal commands issued by the physician during the procedure. As long as the voice instructions are issued within a time frame sufficiently close to the instant the "C" button 10 or foot switch 18 is pressed, the MPS system interprets the content of the oral information, matches the voice data to existing expressions, which are previously provided standardized nomenclatures for medical findings and physiologic locations, and associates the outcome of the voice processing with the index created by the button action. After the procedure is finished, a similar voice controlled data entry job can still be performed.

Exemplary voice recognition software for the aforementioned embodiment is provided by Microsoft Speech API software. This software is found within the Microsoft Tools packages/library for audio recognition. In this embodiment, a sound card should be provided in each MPS workstation if the voice recognition feature is to be used.

6. Specialty Data Format Feature

Since the association between the video indexing information and the video footage is unique to the present invention, there is a need to enclose both entities together prior to transferring the overall data from one point to another. The Specialty Data Format defines how those different components are encapsulated together, and provides for the encapsulation of the Specialty Video Player so that when data is transferred, the receiving party has the ability to observe all the relevant material in a coherent way.

This format feature is designed so that video clips which are recorded on the MPS system, can be viewed with other video viewing systems. The video used in the MPS system is based on standard video formats such as AVI, MPEG1, MPEG2, or MJPEG. However, the MPS Specialty Video Player is capable of displaying more than just video playback. It also shows indexing information, such as finding, location, and comments from the physician, etc. Yet, this information will not be shown if the video footage, which was originally recorded on the MPS system, is viewed on a foreign system.

Thus, the Special Data Format feature is designed to encapsulate the standard video footage with the index information, finding, location. etc., which is referred to as the "MPS Video Format". The MPS Format is compatible with non-MPS Format video players; however, the indexed data will not be shown.

Two formats are provided. The first is MPS video stream only. The second is MPS video stream plus the MPS Specialty Video Player encapsulated into the MPS video stream. Thus, the second would appear as an executable file, which when opened, would cause the MPS SVP to appear and then upon activation, would be capable of showing the MPS video stream.

7. Distributed Video Storage and Management Feature

As previously discussed, FIG. 1 is an illustration of an embodiment of the present invention which depicts a configuration in which several MPS workstations 1 are networked together. The system initially records the video material to its local hard disk drive (referred to as "Local Storage"). However, the MPS file server 3 with video storage array provides a massive amount of centralized data storage optimized for fast access.

Since the MPS workstations 1 are interconnected in a peer-to-peer fashion, in addition to being connected to a centralized file server 3, the user is not confined to the MPS workstation 1 where the procedure record was originally created. Since the MPS workstations 1 are connected in a peer-to-peer network design, each MPS workstation 1 acts as a server on the Ethernet network 9. Thus, each MPS workstation 1 is capable of initiating and terminating sessions, exchanging data and files, and processing information.

After finishing the medical procedure, the physician may walk to any other MPS workstation 1 and start working on the procedure data. High speed network lines 9 (e.g., 100 to 1000 Megabit per second switched Ethernet topology) supply the required networking performance to make the system application provide the user with the appropriate responsiveness regardless of whether the data is being accessed from a local hard disk drive or from the MPS system network (see FIG. 1).

After the initial review, the MPS system software automatically compresses the video material and uploads it to the MPS file server 3 so that the finite amount of storage space available on the MPS workstation is freed up for future use. The MPS system software also manages the storage volume on the MPS File Server. The oldest video material can be further compressed and then moved to removable high-density data storage media such as optical disks, DVD, Jukebox, etc.

B. MPS Procedure Overview:

An MPS endoscopic procedure is performed according to a standardized action plan. The patient calls in to schedule an appointment. A patient record, albeit incomplete, is created if it does not exist yet in the MPS file server 3 database. An appointment is scheduled for a certain date. On the scheduled date, the patient shows up at the medical facility. Additional demographic information is put in the patient record. A pre-procedure interview may be conducted by a nurse or physician. The patient and procedure records in the MPS file server 3 database get fed with additional data. The patient is taken to the procedure room and the procedure is performed. Photos, video, and additional procedure data are fed to the database. When the procedure is over, the physician reviews the procedure record to complete the record and issues the medical report. He also sends feedback to the referring physician.

All the above-noted steps are tracked by the MPS system. Each step is associated with a status flag. These flags are constantly monitored by the software to determine which actions are allowed. For instance, if the procedure is not over yet, a medical report cannot be issued. If the procedure is over then one cannot include additional video material into the record, etc. As will be explained in the next section, the MPS Main Module performs the aforementioned status check in the database at s26 (see FIG. 3).

C. MPS System Software:

1. Overview

Portions of the software provided for the present invention are based on an existing software package, known as "ENDOPRO", which is currently produced and marketed by Pentax Corp. The program is mostly a mix of C++ code and some Power Builder applications.

Figure 2:
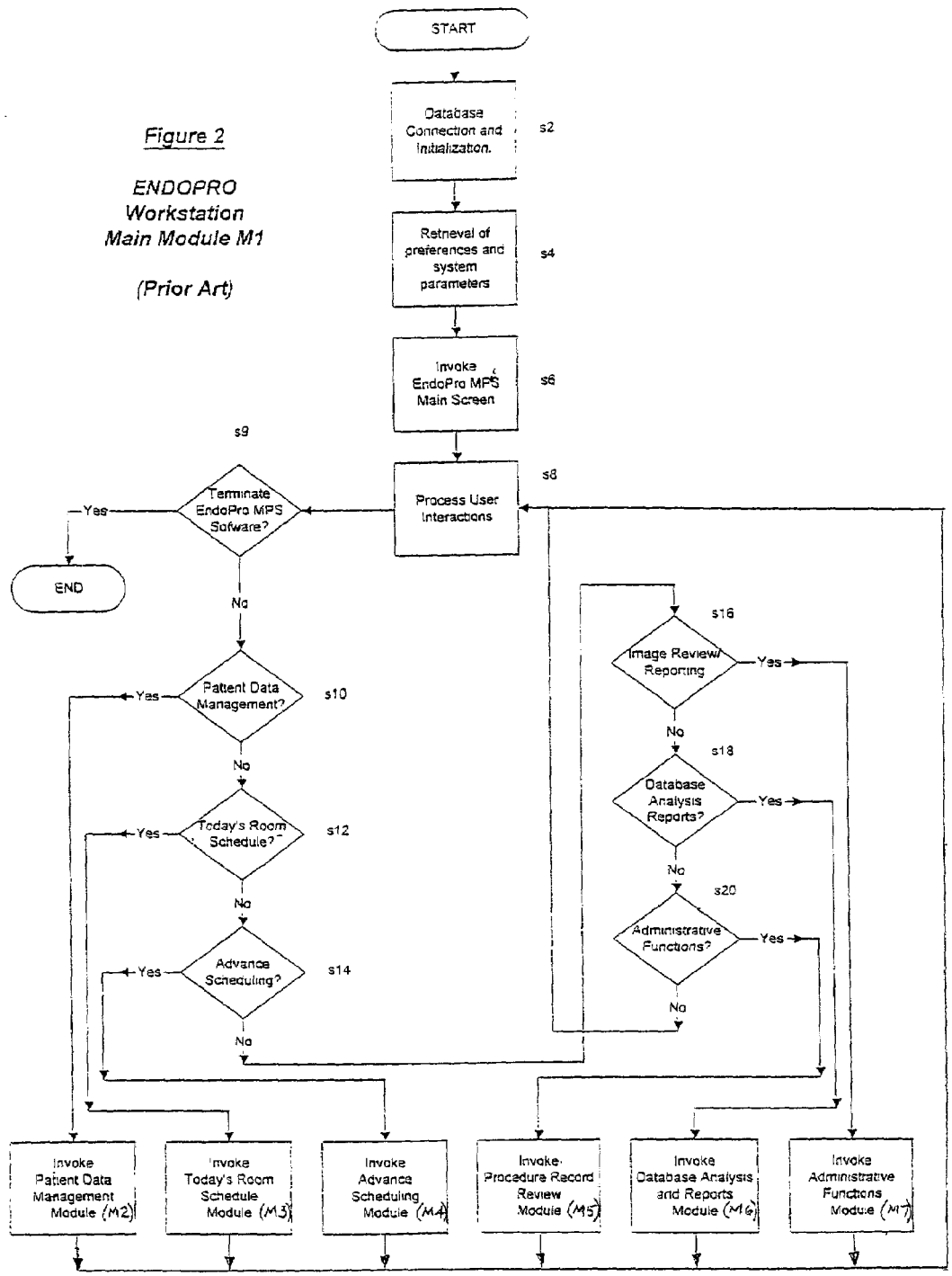
FIG. 2 is a flow diagram of a prior art ENDOPRO Workstation Main Module.

A series of flow diagrams of the MPS system software for implementing the MPS system is provided in FIGS. 2–14. FIG. 2 is representative of the portion of existing ENDOPRO software which is currently available on the market. FIGS. 3–14, illustrate the noteworthy and inventive portions of the software, which are considered an advancement over the current existing ENDOPRO software package provide by Pentax Corp.

FIG. 2 is representative of the ENDOPRO Workstation Main Module M1 which performs the function of initializing the ENDOPRO Main Menu (see FIG. 15) and accepting a user input response for a desired task or operation to be performed on the MPS system. At the start of the procedure, the MPS system database, which is located in the MPS file server 3 with the video storage array (see FIG. 1) is accessed and initialized at s2. Next, system parameters and preferences are retrieved at s4. At s6 the MPS Main Menu (FIG. 15) is displayed on the MPS workstation 1 CRT. At s8 the MPS software waits for user input which designates the task that the user desires to accomplish with the MPS system.

The MPS Main Menu provides the user with six basic selections or tasks: (1) "Patient Data Management", (2) "Today's Room Schedule", (3) "Advance Scheduling", (4) "Image Review/Reporting", (5) "Database Analysis/Reports", and (6) "Administration". It should be noted that the features of the present invention are accessed by either invoking the Today's Room Schedule Module M3 or the Image Review/Reporting Module M5.

Now referring to FIG. 2, steps s10 through s20 reflect the determination of which of the above-noted tasks the user selects and the appropriate initiation of each respective module M2 through M7. After the functions of the modules M2 through M7 are complete, the program returns to s8 to either accept another input from the user indicating a desired task M2 through M7, or the operator can initiate a sequence to power down the entire MPS system at s9.

Figure 3:
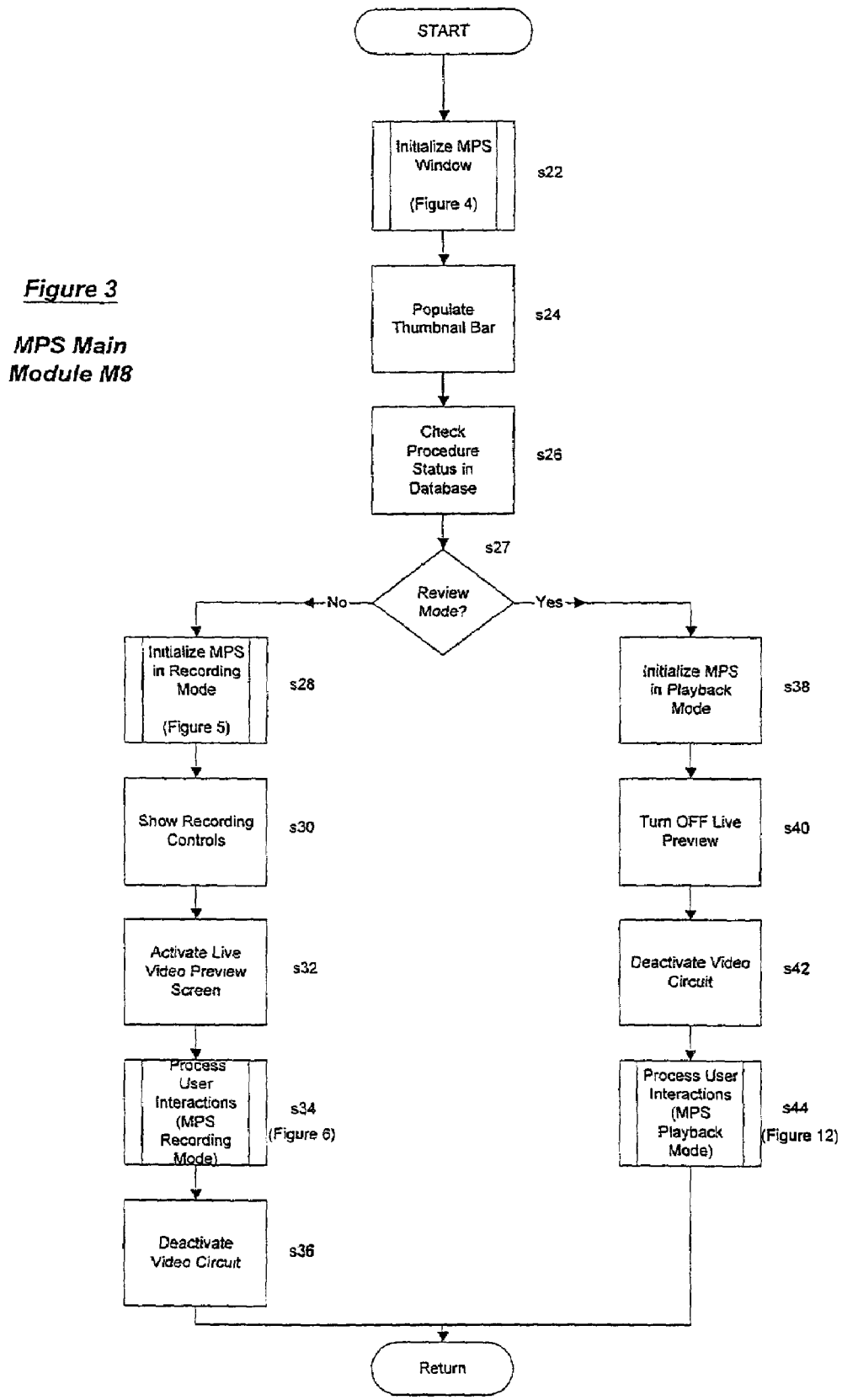
FIG. 3 is a flow diagram of an exemplary MPS Main Module according to an aspect of the present invention.

FIG. 3 depicts an exemplary flow diagram for the MPS Main Module M8. The Main Module M8 will be entered or initiated by either accessing the Invoke Today's Schedule Room Module M3 or the Invoke Procedure Record Review Module M5, as illustrated in FIG. 2. The software link to the MPS Main Module M8 is preferably designed so that it can process one specific patient and one specific procedure at a time.

The patient information is extracted from data that has been input into the MPS system prior to the procedure. Such general information about the patient, can either be entered into the MPS system by invoking the Patient Data Management Module M2 or the Today's Room Schedule Module M3 illustrated in FIG. 16. Once the procedure has been initiated and the MPS Main Module M8 has been invoked, the data assimilated in the Patient Data Management Module M2 or the Today's Room Schedule Module M3, will be accessible to the MPS Main Module M8 so that the same data can eventually be associated with the patient's video clip.

The purpose of the MPS Main Module M8 is to initialize the MPS Main Screen and to then determine which mode of the MPS system is desired, i.e., Recording Mode or Playback Mode. At s22, the Main Module first initializes the MPS Main Screen (or window) illustrated in FIG. 17. Then the thumbnail bar 74 is populated at s24 as illustrated in FIG. 18. The thumbnail bar 74 (also referred to as "Image bar") provides reduced-sized images for user reference. It is located on the lefthand side of the MPS Main Screen. In regards to the embodiment depicted in FIG. 18, the thumbnails are vertically stacked. However, thumbnail bar 74 can also be displayed in a horizontal configuration (not shown).

Next at s26, the software performs a procedure status check in the database 3. Note, this procedure has been already discussed above in a previous section. At s27, the software then determines which mode has been selected based upon the user's input. If the user selects Today's Room Schedule 88 from the MPS Main Menu (see FIG. 15), the MPS system is initialized in the "Recording Mode" at s28. If the user selects the Image Review/Reporting button 89 from the MPS Main Menu, the MPS system is initialized in "Playback Mode" (or review mode) at s38.

Details of the Initialization of Recording Mode are described below with respect to FIG. 5. After the MPS system is initialized in Recording Mode at s28, the recording controls (or buttons) are shown on the MPS Main Screen at s30 (as shown in FIG. 17). It is noted that when the MPS system is initialized in the Recording Mode, the recording controls which are initialized are the second row of buttons comprising the following three buttons: Toggle Preview Window ON/OFF button 76, Toggle Video Capture ON/OFF 78, and the Single Frame Capture button 80.

Next, the Live Video Preview Screen 82 (see FIG. 17) is activated at s32. It is noted that the connection of the video source to the screen (GUI) is actually performed in a two-step process. First, the video source is routed to the screen via a physical connection or "connector" without the video actually being shown on the GUI. This step is accomplished during the initialization step at s28. The second step at s32, actually turns on the video so that it can be viewed by the user.

Then at s34 the MPS system is ready to accept and process user interactions. Details of processing User Interactions (MPS recording Mode) are described below with reference to FIG. 6. Once recording is complete, the software deactivates the video circuit at s36. This is done because the video flow/source to the screen (GUI) is provided in the physical connection or "connector" (as compared to frame-to-frame) and the deactivation of the video circuit reduces the burden on the MPS operating system. Essentially, the deactivation step at s36 is the opposite of the activation occurring during the initialization of MPS Recording Mode in step s28. Finally, the MPS Main Processing Module ends.

If Review Mode is not selected, the MPS system is initialized in Playback Mode at s38 to inhibit the MPS recording capabilities. Upon Playback Mode initialization, the software turns OFF the Live Preview feature at s40 for safety measures (i.e. initialization/deinitialization housekeeping), deactivates the video circuit at s42 to minimize the use of system resources, and then enters the User Interaction Processing (MPS Playback Mode) sequence (see FIG. 12) which processes user interactions/inputs at s44. It is important to note, that even if the Live Preview was ON in this circumstance, the video would not appear on the screen because the video source is not connected as it is in the MPS Recording Mode. In other words, in the Playback mode, live video is not connected. Finally, the MPS Main Module processing ends.

Figure 4:
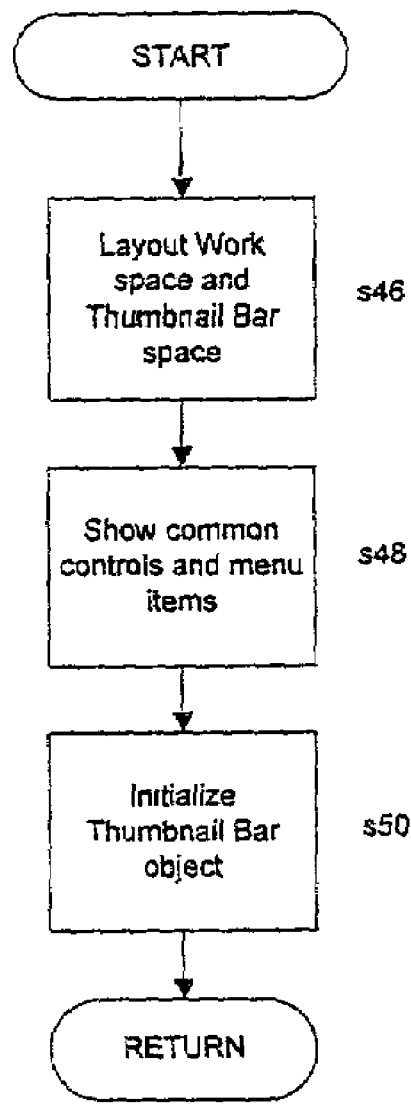
FIG. 4 is a flow diagram of an exemplary sequence for initializing the MPS Main Screen window according to an aspect of the present invention.

FIG. 4 illustrates the MPS Window Initialization sequence which is depicted as s22 in the Main Module M8 (see FIG. 3). At s46, the work space and thumbnail bar space are laid out. At s48, the common controls and menu items are shown. With respect to the disclosed invention, when the term "common controls" is noted, it refers to the standard functions of Microsoft Windows (e.g., functions to allow the user to move or maximize a window). Next, the thumbnail bar object is initialized at s50. At this point, the MPS Window initialization sequence is complete and the logic returns to FIG. 3.

Figure 5:
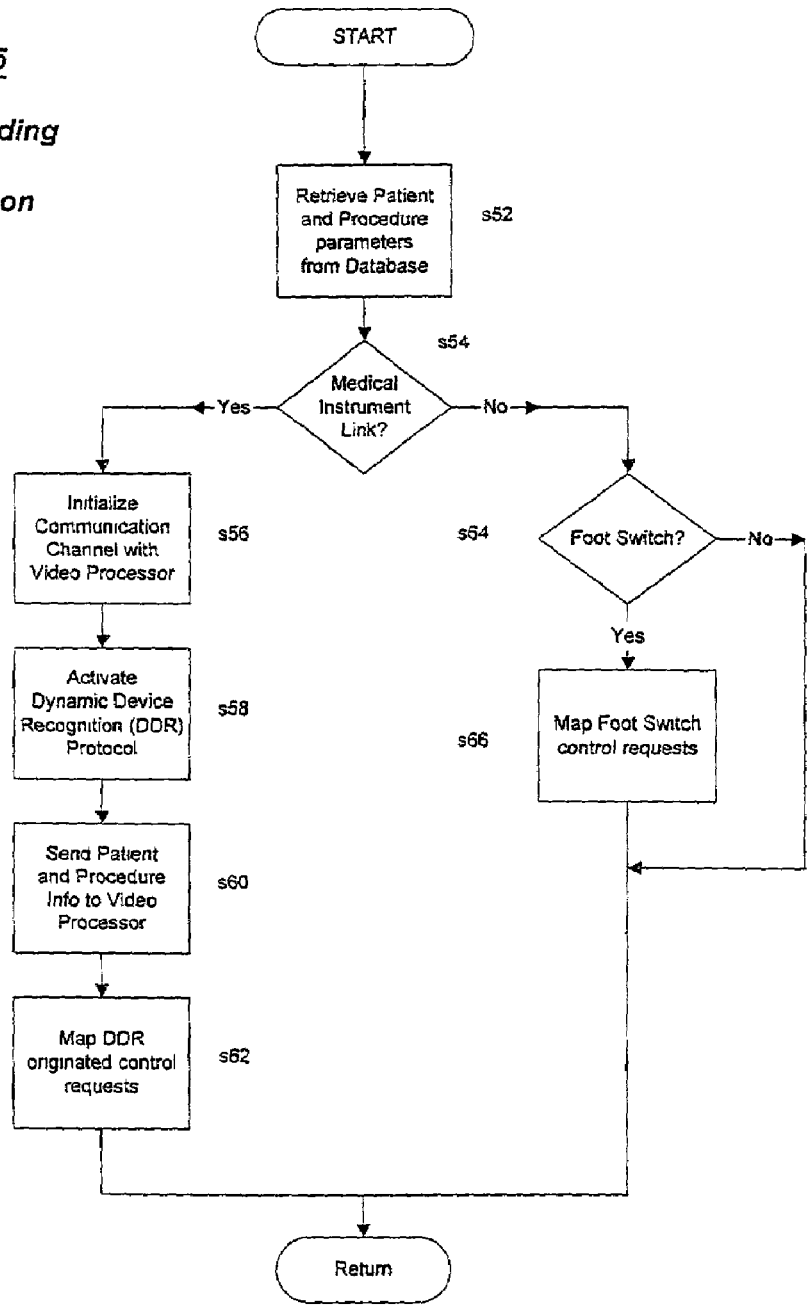
FIG. 5 is a flow diagram of an exemplary MPS Recording Mode Initialization sequence according to an aspect of the present invention.

FIG. 5 depicts the MPS Recording Mode Initialization sequence which is depicted as s28 in the Main Module M8 (see FIG. 3). This sequence sends the patient information to the monitor associated with the medical instrument 2 so that the physician can verify that the information being provided by the MPS system is accurate (i.e., to make sure the patient information actually matches with the person being operated on). This feature is provided so that information is not mistakenly recorded to the wrong record.

First, the patient and procedure parameters are retrieved from the database 3 at s52. At s54, it is determined whether a medical instrument link is required. This step is provided to determine whether the instrument is a compatible product which utilizes the Dynamic Device Recognition (DDR) Protocol. If a link is required, a communications channel with the video processor 5 is initialized at s56. At s58, DDR Protocol will be activated. The DDR Protocol will be explained in greater detail later in the specification.

Once a physical channel is established and operational, the patient and procedure information is sent to the video processor 5 and medical instrument at s60 which becomes an overlay on the video screen. Thus, when the physician is watching the main monitor while the procedure is being performed, not only will the video be displayed on the screen, but also the patient information will be displayed. Once again, this information is displayed as a measure to verify that the information being recorded and indexed during the procedure accurately describes the subject being operated on. Finally, DDR originated control requests are then mapped at s62 and the control then returns to processing described with respect to FIG. 3.

In some instances, non-compatible medical instruments are employed. If this is the case, because the non-compatible devices do not use DDR Protocol, and thus have no data exchange capability, a foot switch 16 is required to activate still image capture or toggle the video recording ON or OFF. Therefore, if a medical instrument link is not included, the MPS system software determines whether a foot switch 18 is being utilized at s64. If a foot switch 18 will be utilized, the software will map the foot switch requests to the corresponding software functionality at s66. Upon completion of the MPS Recording Mode Initialization sequence, the program will continue to the MPS Main Module M8 at s30 by showing the recording controls.

Another option that the MPS system provides, if a foot switch is not available, is a basic mouse or keyboard input device. In this case, the user would simply input data into the MPS system via the MPS workstation 1, either by mouse or keyboard input. In this case, s66 is skipped.

Figure 6:
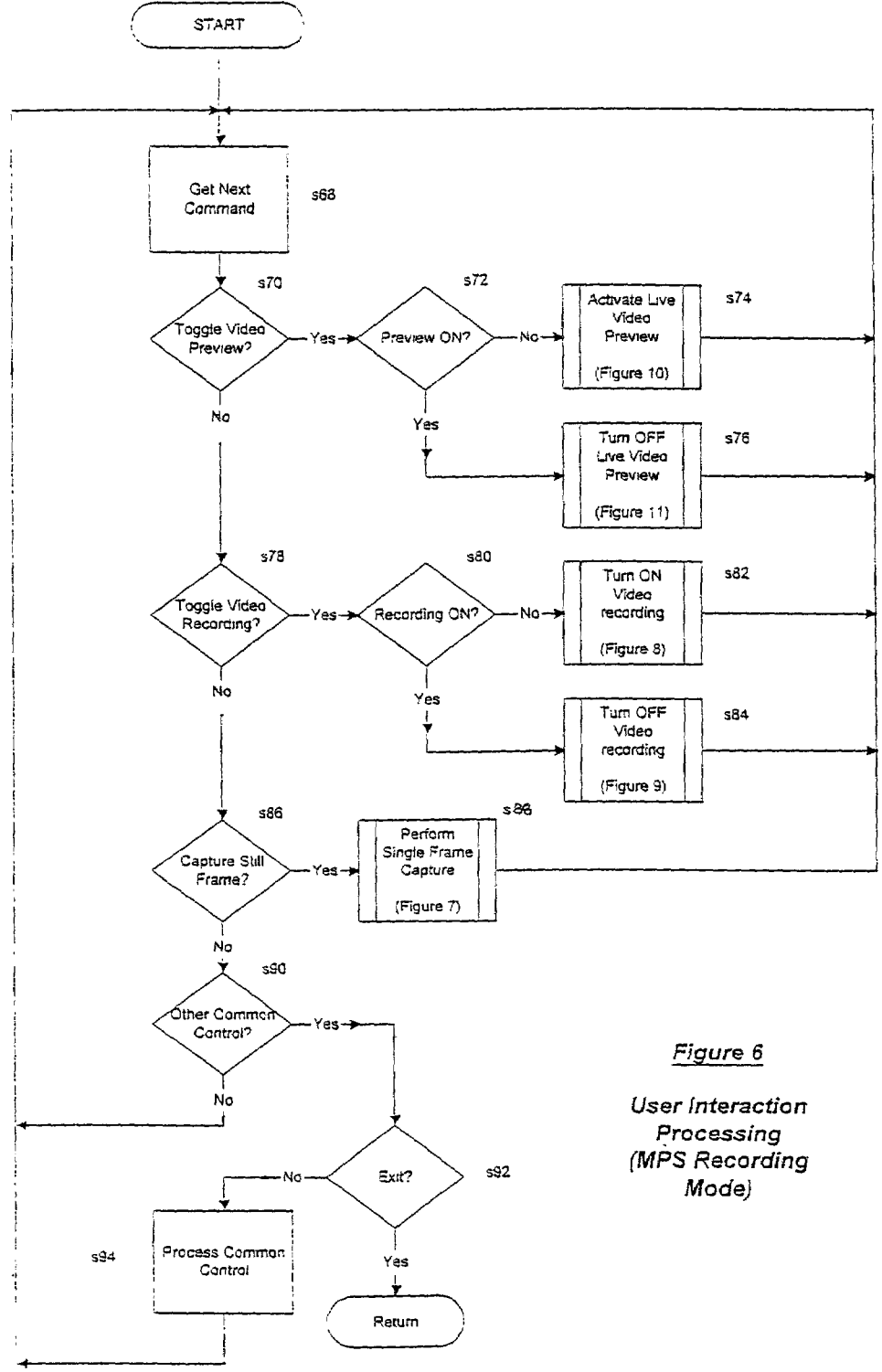
FIG. 6 is a flow diagram of an exemplary User Interaction Processing (MPS Recording Mode) sequence according to an aspect of the present invention.

FIG. 6 depicts the User Integration Processing (i.e., MPS Recording Mode) sequence which is depicted as s34 in the Main Module M8 (see FIG. 3). Typically there are two major functions which are performed in this sequence. One is to toggle the video recording ON or OFF. The other is to perform the single frame capture.

At s68, the program is ready to receive a user input command. At s70 if Toggle Video Preview is actuated ON, the software further determines whether the Preview feature has been previously turned ON at s72. If not, a live video preview is activated at s74; if yes, the live video preview is turned OFF at s76. In both cases, the logic returns to s68 to await the next user input command.

If at s70 the toggle video preview is not selected, the software then determines whether the toggle video recording has been selected at s78. If yes, it is next determined whether the recording feature has been previously turned ON at s80. If not, the video recording is turned ON at s82; if yes, the video recording is turned OFF at s84. In both cases, the logic returns to s68 to await the next user input command.

If at s78 the toggle video recording is not activated, the software then determines whether a still frame is to be captured at s86. If yes, the MPS system will perform a single frame capture at s88. If not, the program determines whether any other common control is activated at s90. At this step, for instance, the software would process mouse controls or keyboard inputs to minimize or maximize the window, or menu items, etc. If a common control command has been received, the program then determines whether the command indicates that the user wants to exit the program at s92. If an exit is not desired, the common control is processed at s94 in a known manner. After this step, the next command is accepted at s68. If an exit has been requested, the sequence will terminate. If no other common control is selected at s90, then the logic returns to get the next command at s68.

Figure 7:
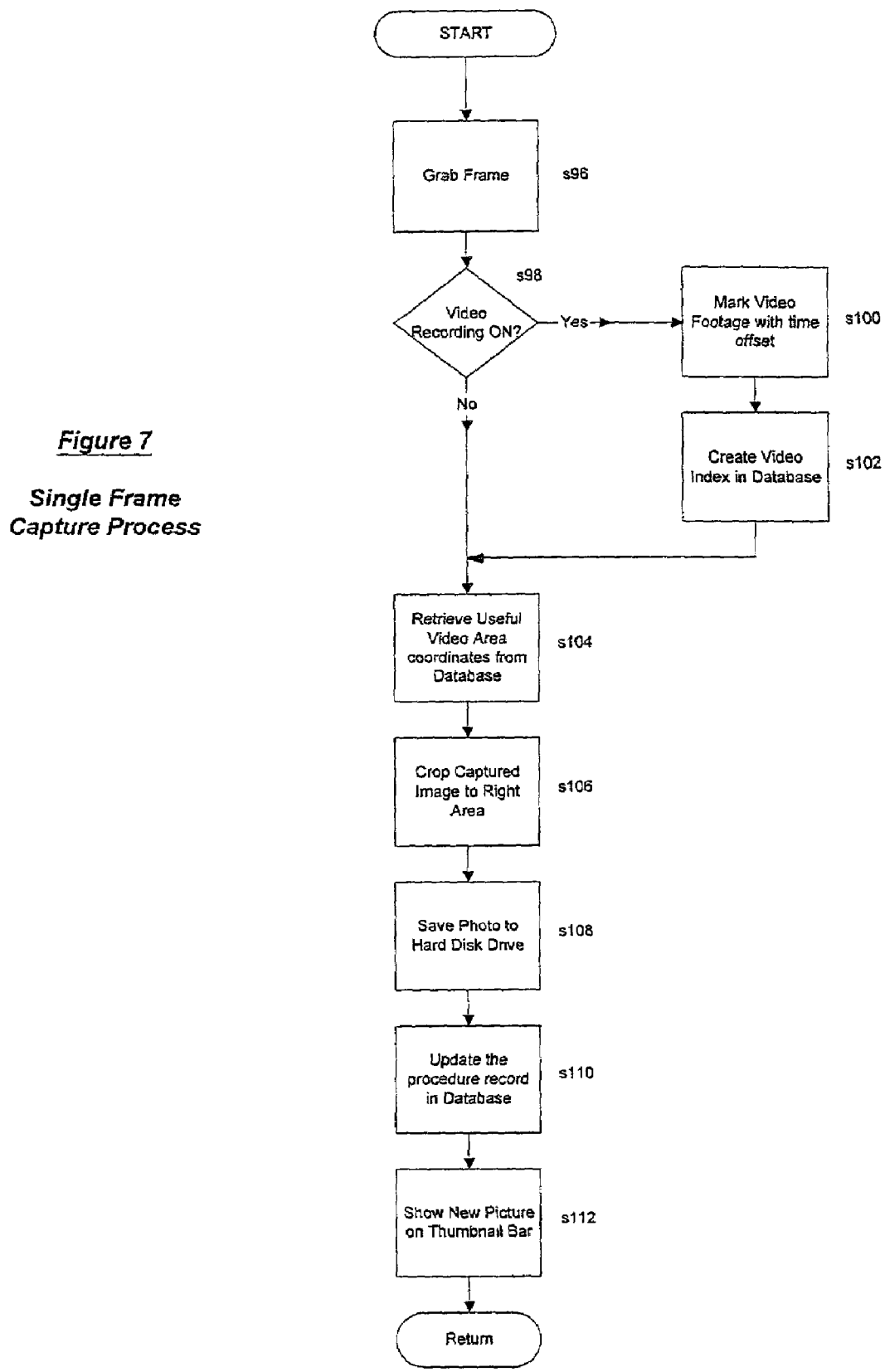
FIG. 7 is a flow diagram of an exemplary Single Frame Capture Process sequence according to an aspect of the present invention.

FIG. 7 illustrates the Single Frame Capture Process sequence which is depicted as s88 of FIG. 6 User Interaction Processing (MPS Recording Mode). At s96, the software grabs a frame. Eventually the frame will be saved later in the sequence, but first the sequence determines whether the Video Recording is ON at s98. If a recording is being performed, the video recording will be ON. If yes, the video footage is marked with a time offset at s100. For example, assuming the recording has been ON for five minutes, the system knows that the footage that is being grabbed relates to the instance five minutes into the footage.

At s102 an index is created, meaning that in the database, the instance is marked. It is noted that whether the index is marked during the original procedure or post-procedure (i.e., when the video is being played back on the screen), the same sequence or algorithm for creating the index is used.

An additional index record is created which identifies the time-offset of the footage being referred to and within the footage the offset that is being referred to. Within the index, three data fields are created which remain empty but will later be filled in. The three fields include: (1) the finding, (2) the location of the finding, and (3) free text comments with regard to the finding and the location.

The information to be provided for indexing can be provided in at least two ways. For example, the data can be provided during the procedure, with a voice recognition system. Alternatively, the information can be provided after the procedure when the review is being performed. At that time, the physician or medical staff will incorporate the findings.

At s98, if the video recording is not ON, and also after the video index is created in the database at s102, the software next retrieves useful video area coordinates from the database at s104. With respect to the grabbed frame from s96, it is important to identify what area of the image is actually useful because medical instruments often do not provide an edge to edge clear picture. Instead, many times the medical instrument provides a useful picture and next to it is a black margin area with a variety of encoded information, such a the patient's name, color bars on the bottom of the screen, etc. Thus, to eliminate the undesired margin area, the captured image is cropped to the proper area at s106. Next, the photo is saved to the MPS local hard drive at s108, the procedure record is updated in the database at s110, and finally a new picture is shown on the thumbnail bar 74 at s112 and the logic returns.

Further detail will now be provided about how the useful area video area coordinates from the database at s104 are determined, and furthermore, how the captured image is cropped at s106. As discussed previously, the ENDOPRO software is provided with a command protocol known as ENDONET Serial Data Communication Protocol Version 2.2.1 (hereinafter DDR). This software is basically the conversation between the medical instruments and the MPS system so that when there is a request coming from the medical instruments for image captures, recording, etc., it identifies itself by sending two identifiers. One is a video processor identifier and the other is a video endoscope identifier. Typically, the two combined together define the camera eye which is being used. Further discussion on how DDR functions will be provided in a following section.

At any given time, when the MPS system is interacting with the medical instruments, the MPS system is provided identifying data so that it can identify which specific instrument is being used. Based on this definition, tables are provided which identify the useful area of the captured image. The endoscope identifier gives the physical dimensions of the images (i.e., horizontally and vertically). The video processor identifier gives the bottom left corner of the useful image against the overall screen area. Therefore, by using both identifiers, there is sufficient information to identify the useful portion of the image or video footage.

This information is also saved when a capture is performed for either an image or video footage. This is done because in the middle of the medical procedure, it may be necessary to change the instrument due to failure or contamination. If such an instance occurred, it would be a much longer process to change the entire video processor. It is possible the replacement instrument may have a different sized CCD.

If a playback is being performed, because the information was recorded during the procedure, the information is saved with the video recording. Thus, it is known what type of video camera or video source (i.e. medical instrument 2) and what type of video processor, was being used, and this information is provided with the video footage. Thus, base on the two parameters (i.e., endoscope identifier and video processor identifier) it is possible to check look-up tables to determine the useful coordinates to properly crop the image or video footage.

If the video is being recorded, the original video is kept intact until after the procedure is complete. Thus, the cropping information during a live recording is provided by a handshake between the medical instrument 2 and video processor 5.

Figure 8:
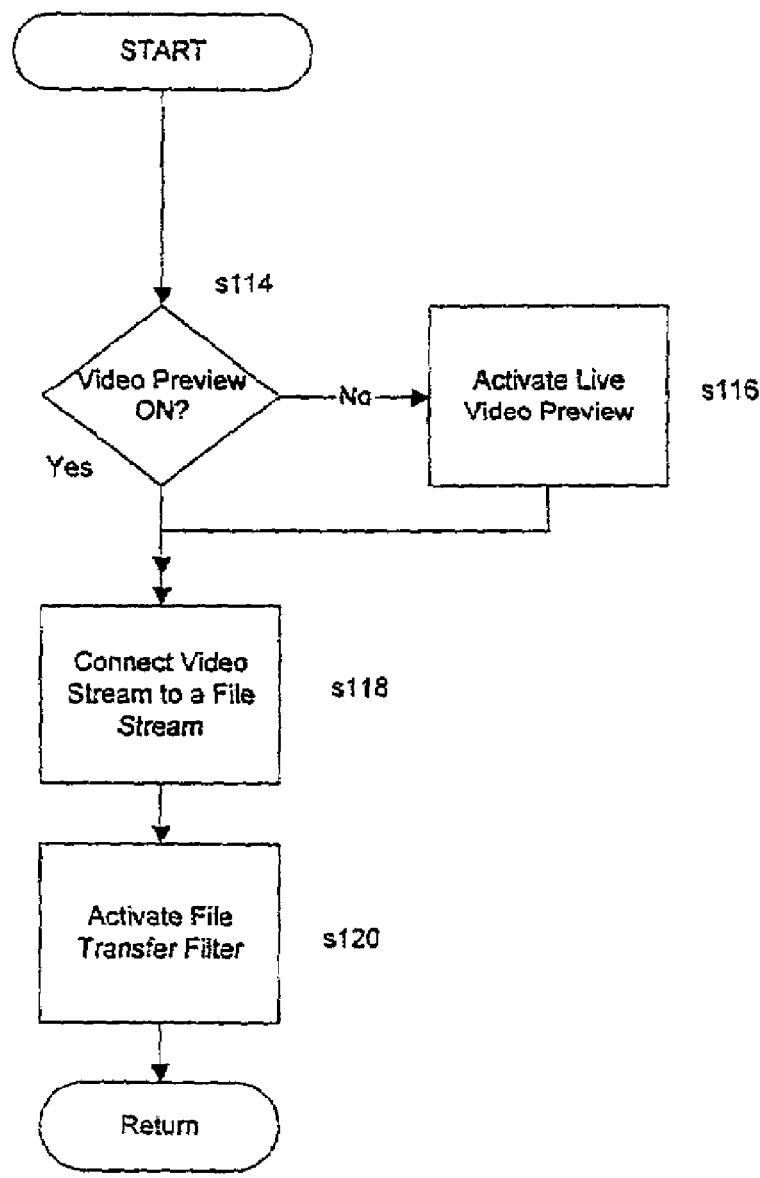
FIG. 8 is a flow diagram of an exemplary Video Recording ON Process sequence according to an aspect of the present invention.

FIG. 8 illustrates the Video Recording On Process sequence which is depicted as s82 from FIG. 6 User Interaction Processing (MPS Recording Mode). At the beginning of the sequence, the software determines whether the video preview is ON at s114. If not, the live video preview is activated at s116. If the video preview is ON at s114, then the video stream is connected to the file stream at s118. Also, after the live video preview is activated at s116, the video stream is connected to the file stream at s118. With respect to the present invention, the lower layers of the Microsoft Windows operating system are notified that a specific video stream is going to be connected to a file stream at s118. Once the connection is created, the connection has to be activated, which is done using a standard Microsoft Windows operating system protocol. Thus, the connection must be established before it can be activated.

Next, at s120 the file transfer filter is activated and then the logic returns to FIG. 6. The transfer filter from s120 relates to how video is processed within the Microsoft Windows operating system; in particular, by the "Active-X"/"Direct Show" layer of Windows. The Active-X/Direct Show feature basically provides First-In First-Out buffers as filters. A filter has an entry point and exit point. The entire incoming video from an outside source (i.e., video processor 5) goes through a number of filters which are connected to each other. A filter's output is connected to another filter's input. Each filter performs a variety of functions which are standard Microsoft Windows operating system functions. The data which goes through a filter is referred to as a stream. In simplified terms, the incoming video stream is connected to a filter and the output of the filter is connected to another device, such as the hard disk drive.

Therefore, the purpose of steps s118 and s120 is to ensure that the incoming video stream from s118 is mapped to the file on the hard disk drive so that all video data coming through the video channel is properly stored to the hard disk drive and at the same time the video stream is displayed on the screen.

Figure 9:
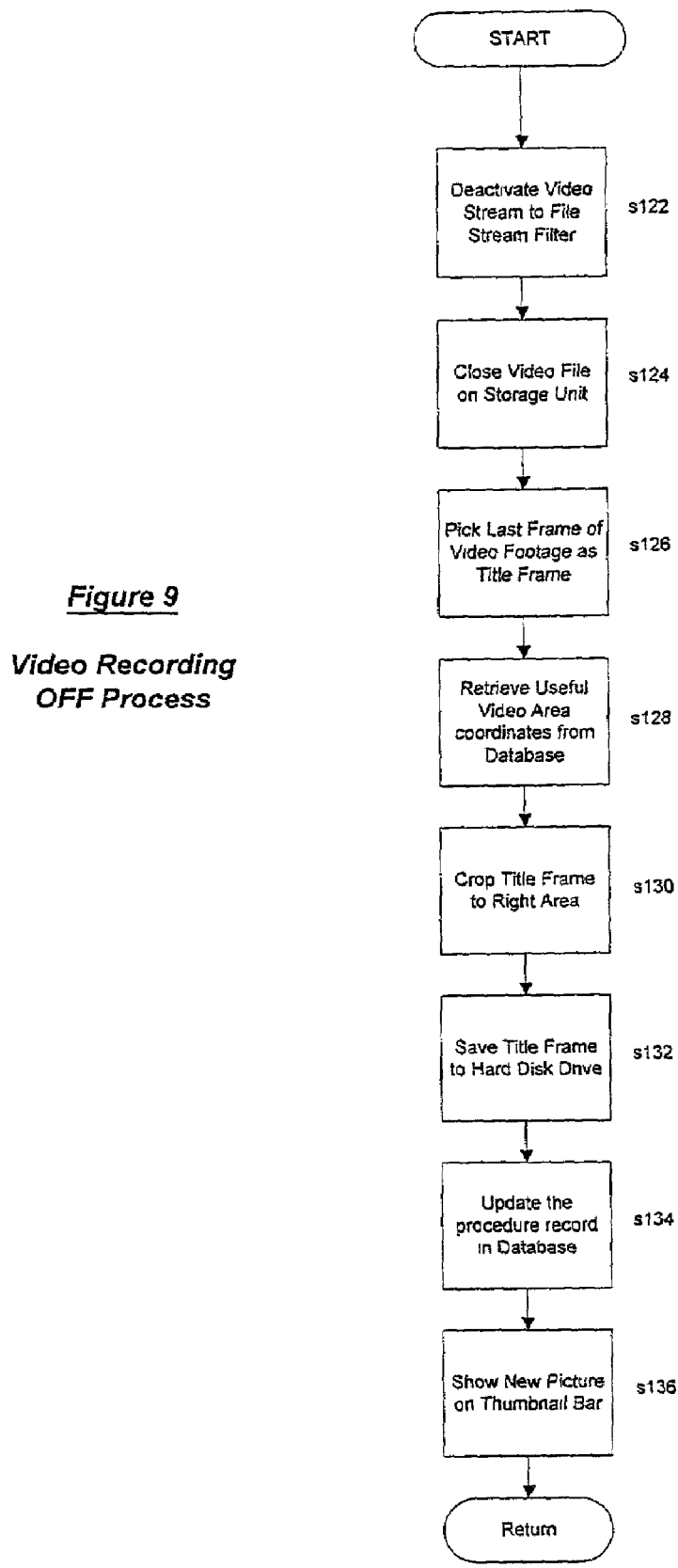
FIG. 9 is a flow diagram of an exemplary Video Recording OFF Process sequence according to an aspect of the present invention.

FIG. 9 illustrates the Video Recording OFF Process sequence which is depicted as s84 from FIG. 6 User Interaction Processing (MPS Recording Mode). At s122 the sequence initially deactivates the video stream to the file stream filter. Next, the video file on the storage unit is closed at s124, the last frame of the video footage is picked as a title frame at s126, and useful video area coordinates are retrieved from the database at s128. At s130, the title frame is cropped to the proper area, then saved to memory at s132, the procedure record is updated in the database at s134, and finally a new picture is shown in the thumbnail bar is shown at s136 and the logic returns to FIG. 6.

It is important to note that the live video footage which is being recorded to the hard disk drive keeps it full size and is not cropped. But when a title frame is being created (e.g., the last frame of the video clip), the frame is cropped at s130 to the proper useful dimensions. This function is considered to be a "dynamic" process. With compatible instrumentation, the process is accomplished on an image per image basis. Every time a video toggling or video capture request is created, it is reanalyzed to verify what specific video device is connected to the system or what is the source of video to be provided (i.e., device recognition logic).

If the medical instrument device is not a compatible product, through the administrative functions of the ENDOPRO software, a device can be simulated or arbitrarily it can be associated with useful image coordinates. For example, there are x-ray machines about which it is known the most useful areas of the screen. The ENDOPRO software provides a table to identify third party devices which provides useful image coordinates for each respective device. In this case, the function is considered a "static" process; i.e., the user has to input into the MPS system what non-compatible device is being used.

Figure 10:
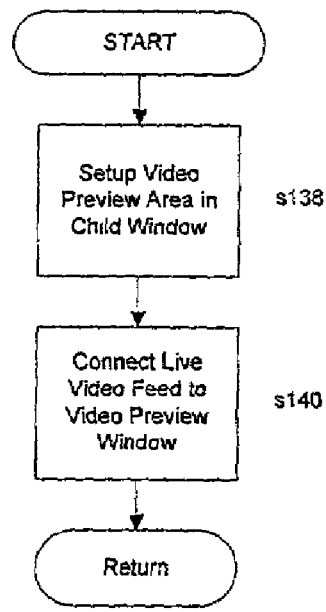
FIG. 10 is a flow diagram of an exemplary Live Video ON Process sequence according to an aspect of the present invention.

FIG. 10 illustrates the Live Video Preview On sequence which is depicted as s74 User Interaction Processing (MPS Recording Mode) from FIG. 6. It basically details how the Video Preview is toggled on. This sequence comprises setting up a video preview area in a child window at s138 and connecting the live video feed to the video preview window at s140. Subsequently, the logic returns to FIG. 6.

Also at s140, the color adjustments are being activated so that if the user wants to adjust the color, he/she can call up a menu item and change parameters such as brightness, contrast, red, green, blue, etc. This is accomplished by building blocks provided by the Microsoft Windows operating system Active-X/Direct Show component library.

Figure 11:
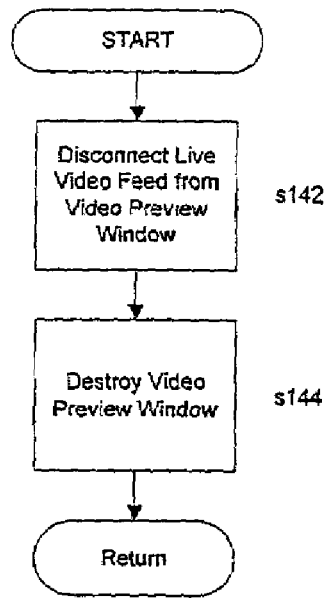
FIG. 11 is a flow diagram of an exemplary Live Video OFF Process sequence according to an aspect of the present invention.

FIG. 11 illustrates the Live Video Preview OFF sequence which is depicted as s76 from FIG. 6, User Interaction Processing (MPS Recording Mode). It basically details how the Video Preview is toggled on. This sequence comprises disconnecting the live video feed from the video preview window at s142 and then destroying the video review window at s144. Subsequently, the logic returns to FIG. 6.

Figure 12:
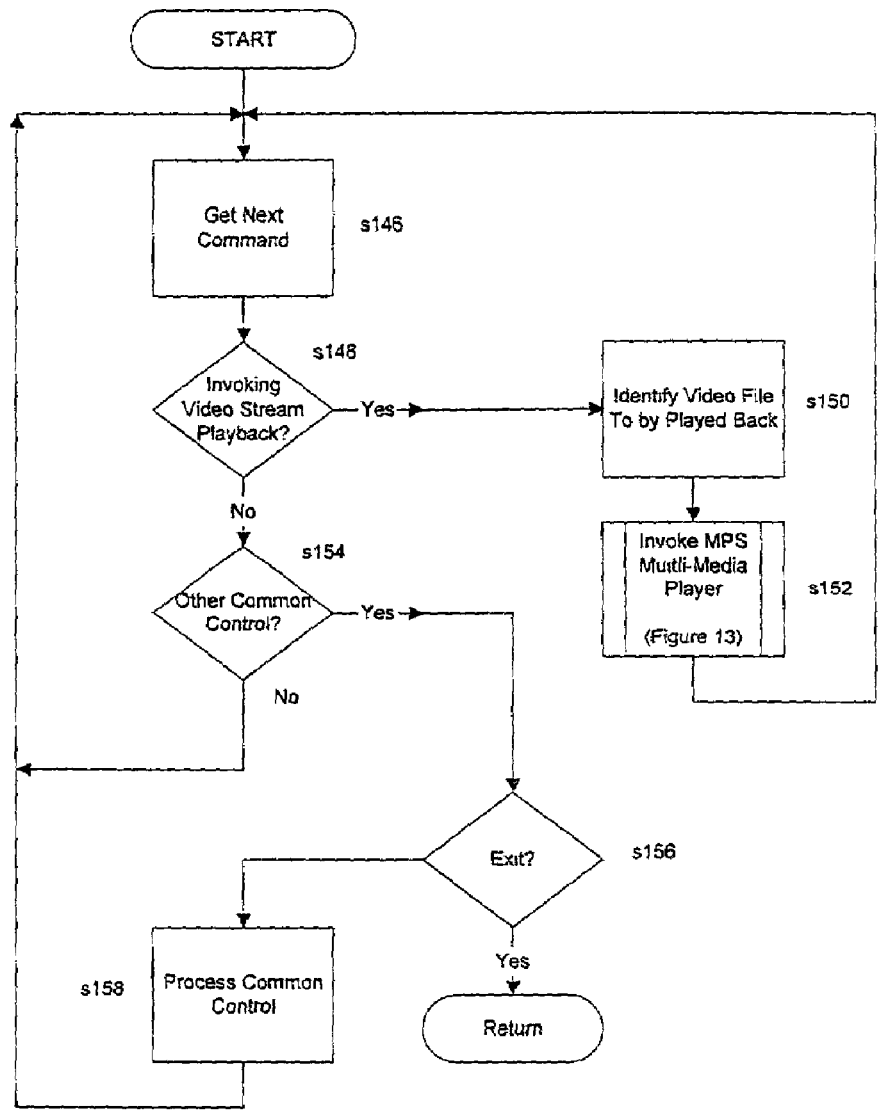
FIG. 12 is a flow diagram of an exemplary User Interaction Processing (MPS Playback Mode) sequence according to an aspect of the present invention.

FIG. 12 depicts the User Interaction Processing (i.e., MPS Playback Mode) sequence which is depicted as s44 in the Main Module M8 (see FIG. 3). The purpose of this sequence is to scan for incoming commands, such as mouse interactions on software buttons and direct appropriate responses. At s146, the program is ready to receive a user input command. At s148 if video stream playback is invoked, the video file to be played back is identified at s150. At s148 there are several subfunctions which can invoke the playback of a video clip. For example, a double click on a thumbnail image 74, or a right click on the thumbnail 74 in conjunction with the display of a drop down menu in which the user chooses "Playback Video".

S150 entails passing a fully qualified name and path for the video clip, whether on the local disk drive or file server, to the MPS Multi-Media Player. The player then recognizes that it has received video footage which will be played back. Next, the MPS Multi-Media Player Module M9 (see FIG. 13) is invoked at s152. This step can be accomplished by double clicking on any video thumbnail 74, for instance, "Video #1" from FIG. 18. Then, the logic returns to s146 to await the next command.

If at s148 the video stream playback is not invoked, the software then determines whether any other common control is activated at s154. If at s154 a common control command is input by the user, the program then determines whether the user wants to exit at s156. If an exit is desired, the logic returns to FIG. 3. If an exit is not desired, the common control is processed at s158 and the logic returns to s146 to await the next command. Furthermore, if at s154 no common controls are activated, the logic also returns to s146 to await the next command.

Figure 13:
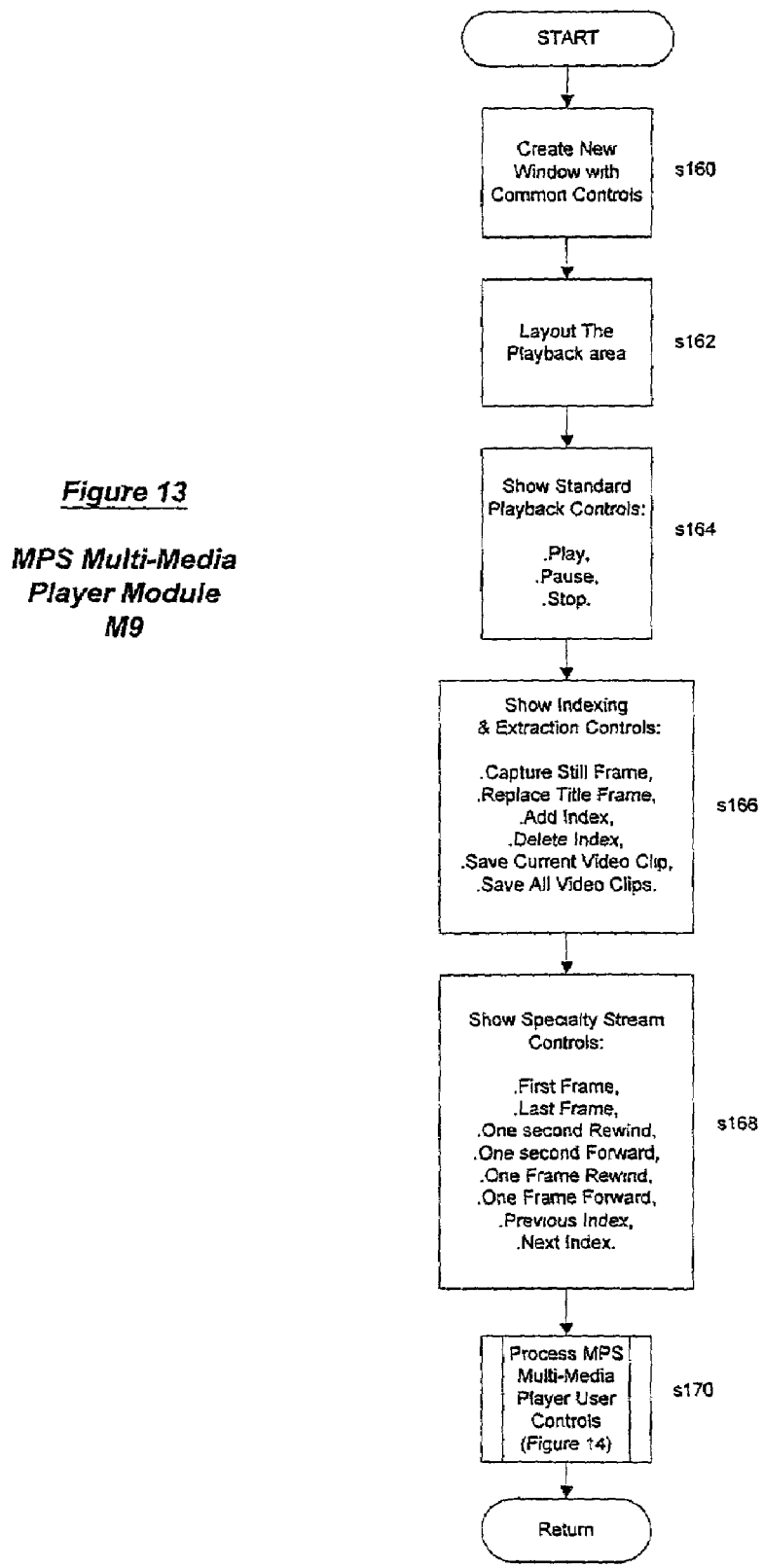
FIG. 13 is a flow diagram of an exemplary MPS Multi-Media Player Module according to an aspect of the present invention.

FIG. 13 diagrams the MPS Multi-Media Player Module M9 which is depicted at s152 in User Integration Processing (MPS Playback Mode) from FIG. 12. Initially, a new window (i.e., child window) is created with common controls at s160. Next, the playback area is laid out at s162. Exemplary standard playback controls, including Play 52, Pause 54, and Stop 56, are shown at s164 and are illustrated in FIG. 21.

Next, the Indexing and Extraction Controls are shown at s166, including: Capture Still Frame 22, Replace Title Frame 24, Add Index 26 (or Create Marker), Delete Index 28 (or Delete Marker), Save Current Clips 30 and Save All Video Clips 32 as illustrated in FIG. 21. Then the Specialty Stream Controls are shown at s168, including First frame 64, Last Frame 62, One Second Rewind 58, One Second Forward 68, One Frame Rewind 60, One Frame Forward 66, Previous Index 70, and Next Index 72, as illustrated on FIG. 26. Finally, the MPS Multi-Media Player user controls are process at s170 and the logic returns to FIG. 12.

The Capture Still Frame feature 22, which has been previously discussed with respect to FIG. 7, is now further detailed. When the video is being played back, the user can pause and capture a frame and save it. The single frame image may be saved as a JPEG file and a thumbnail is provided on thumbnail bar 74 as illustrated in FIG. 18.

Another feature is the Replace Title Frame 24. The image which is shown as a thumbnail can be used to characterize or symbolize the video footage. This frame is referred to as the "Title Frame". In default mode, the MPS system will take the last frame from the video footage and use it as the title frame. But most of the time, the last frame of the footage is irrelevant and does not represent anything which summarizes the gist of the video footage. Thus, the Replace Title Frame feature 24 allows the user to choose any image throughout the video footage to become the title frame.

Another feature is the Add Index 26 (Create Marker) and Delete Index 28 (Delete Market) features. These features will be further discussed in the following MPS Specialty Video Player section. The features basically allow the user to create or delete an index during playback. Thus, the MPS system not only allows for the creation of indexes while recording the procedure, but it also allows for the creation or deletion of indexes in the review mode. For instance, a physician may during the procedure create more indexes than are required. Thus, this gives the user the ability to delete unnecessary duplicated indexes.

Figure 14:
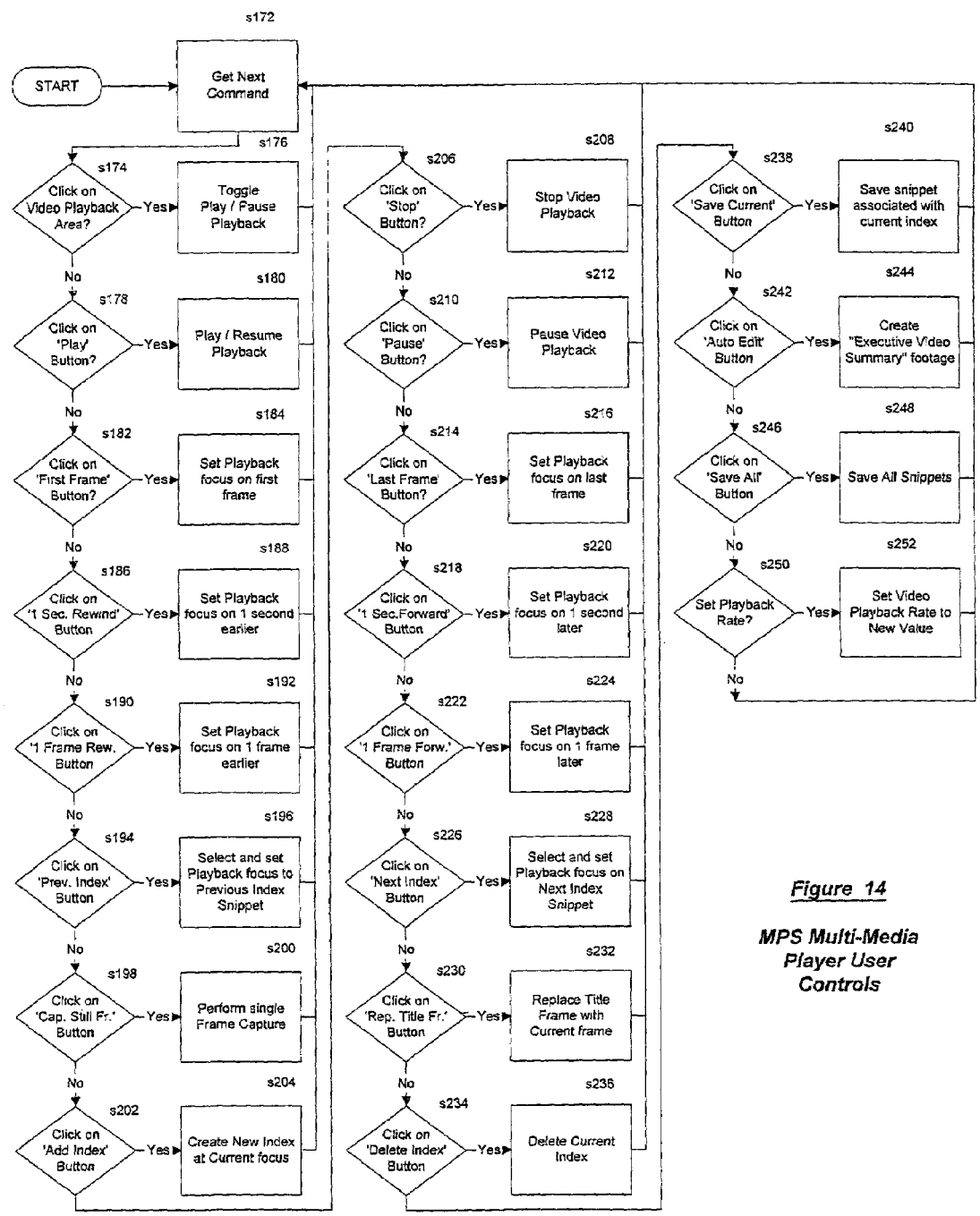
FIG. 14 is a flow diagram of an exemplary MPS Multi-Media Player User Controls according to an aspect of the present invention.

FIG. 14 illustrates the MPS Multi-Media User Controls as depicted as s170 of the MPS Multi-Media Player Module (see FIG. 13). Initially at s172, the software receives a command from the user. At s174, the software determines whether the video playback area has been selected. If yes, the play/pause playback is toggled at s176. If not, the software determines whether the "play" button has been clicked on at s178. If yes, play/resume is executed at s180. If not, the software determines whether the "First Frame" button has been selected at s182. If yes, the playback focus is set on the first frame at s184. If not, the software determines whether the "One Second Rewind" button has been selected at s186.

If the "One Second Rewind" button has been selected, the software sets the playback focus on one second earlier at s188. If the "One Second Rewind" button has not been selected, the software will check to see if the "One Frame Rewind" button has been selected at s190. If yes, the software will set the playback focus on one frame earlier at s192. If the "One Frame Rewind" button has not been selected, the software will check to see if the "Previous Index" button has been selected at s194. If yes, the playback focus is selected and set to the previous index video footage at s196. If not, the program determines whether the "Capture Still Frame" button has been selected at s198. If so, a single frame capture is performed at s200. If not, the program determines whether the "Add Index" button was selected at s202. If yes, a new index is created at the current focus at s204. If not, it is next determined whether the "Stop" button has been selected at s206. If yes, the video playback is stopped at s208.

If the "Stop" button is not selected at s206, the software then determines whether the "Pause" button has been selected at s210, and if so, the video playback will be paused at s212. If the "Pause" button is not selected at s210, the software determines whether the "Last frame" button has been selected at s214. If so, the playback focus on the last frame is set at s216. If the "Last Frame" button has not been selected, it is next determined whether the "One Second Forward" button has been selected at s218. If the "One Second Forward" button has been selected, the playback focus is set on one second later at s220, if not, the software then determines whether the "One Frame Forward" button at s222 has been selected. If it has been selected, the playback focus is set on one frame later at s224.

If the "One Frame Forward" button at s222 has not been selected, it is next determined whether the "Next Index" button has been selected at s226. If so, playback focus on the next video clip will be selected and set at s228. If not, the software then determines whether the "Replace Title Frame" button has been selected at s230, and if so, it replaces the titles frame with the current frame at s232. If the "Rep Title Frame" button has not been selected, it is next determined whether the "Delete index" button has been selected at s234, and if so, the current index is selected at s236.

If the "Delete Index" has not been selected, it is next determined whether the "Save Current" button has been selected at s238. If it has been selected, the video clip associated with the current index is saved at s240. If not, it is next determined at s242 whether "Auto Edit" has been selected, and if so, an "Executive Summary Video" footage is created at s244. If "Auto-Edit" has not been selected at s242, the program determines whether the "Save All" button has been selected at s246, and if it has, all video clips will be saved at s248.

Finally, if the "Save All" button has not been selected at s250, the software determines whether the user wants to set the playback rate at s250, and if so, the video playback rate is set to a new value at s252. If the user does not want to set the playback rate at s250, the program returns to s172 and is ready to receive the next command. Furthermore, after each occurrence of all of the above-noted control functions, the software is directed back to s172 to receive the next command.

2. Dynamic Device Recognition (DDR) Protocol

It should noted that the present application incorporates by reference, the attachment entitled "ENDONET Serial Data Communication Protocol Version 2.2.1" which was disclosed in Provisional Application No. 60/291,638.

The ENDONET Serial Data Communication protocol version 2.2.1, otherwise referred to as Dynamic Device Recognition (DDR) Protocol is the command protocol that allows for bi-directional communications between the video processor 5 and imaging platforms provided in the MPS system software installed on the MPS workstation 1.

In order to send the patient information to video processor 5, and receive video capture requests from it, the MPS workstation 1 communicates, via a serial link, with a universal data interface (UDI). In one embodiment, the UDI is located within the video processor 5. The UDI provides serial input/output port capability. In another embodiment, the UDI may be a separate component interfaced with the video procesor 5, such as the EPM-3000 and EPM-3310 models manufactured and offered by Pentax.

The communication takes place on an asynchronous basis in compliance with the RS232C specifications. The lines TX, RX, RTS (request to send), CTS (clear to send), DTR (data terminal ready), DSR (date set ready), and GND are effectively used, and CD and RI are both left out Data transfer between both sides is bi-directional and full duplex, even though the packet based protocol is built upon a half-duplex paradigm. Both sides of the link perform interrupt driven interactions with their respective host circuitry for a reliable communication. Additionally, the protocol includes error detection capabilities.

At the transport layer, information to be exchanged with the other party is encapsulated into well defined data packets. The packets are clearly identified with beginning and ending flags in such a way that the network layer can identify them without having to analyze their content. Each packet also includes a one-byte packet identification key that indicates to the system layer which method to use in order to process the packet. A check-digit included in the packet allows the network layer to check for data integrity and to disregard the data if problems during data transfer are detected.

Data packets are transmitted from the UDI to a video capture utility (VCU). The VCU provides a communications link having a serial data line and a video line. The function of the VCU is to provide image capture capability on computer based hardware, such as the MPS workstation 1. In one exemplary embodiment, the VCU function may be provided within the MPS workstation 1 via software. In another exemplary embodiment, a separate VCU machine with eight channel capability may be connected to the entire MPS network 9 to provide video capture for multiple MPS workstations 1. Hence, one VCU machine, can be alloted to an entire MPS network.

Figure 26A:
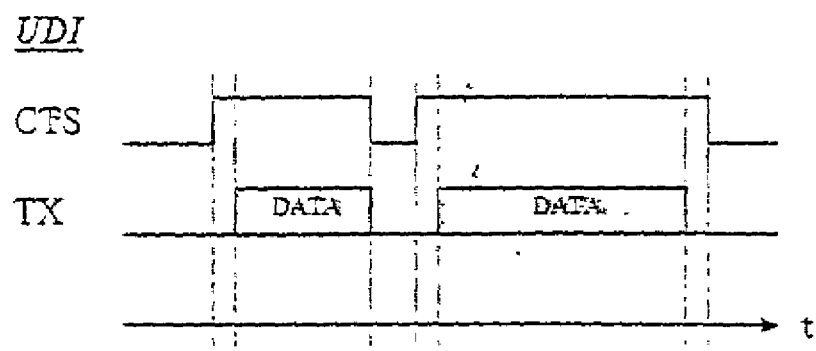
FIGS. 26(*a*) and (*b*) illustrate packet transmission from the video processor to the imaging platform according to an aspect of the present invention.

The packet transmission from the UDI to VCU is illustrated in FIG. 26(a). Here, the UDI checks its CTS input for high condition. When it has data to transfer and CTS is high, it starts sending data over the TX line. If CTS goes low during its transmission, it indicates that VCU is asking for a halt, therefore it stops transmitting right away. When CTS high condition is reestablished, it resumes sending data again.

Figure 26B:
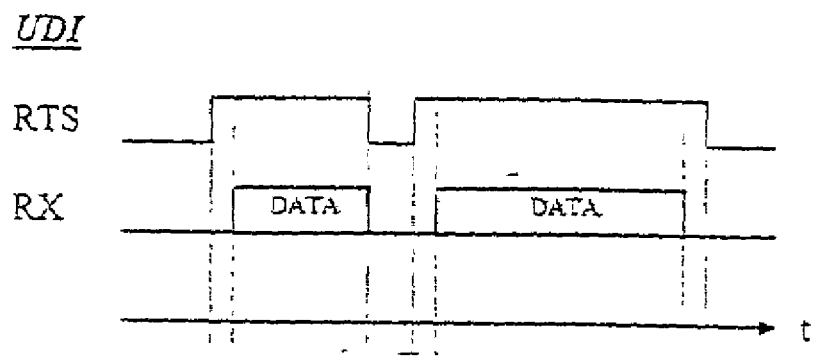

The packet transmission from VCU to UDI is illustrated in FIG. 26(b). Here, the UDI keeps its RTS high and receives the incoming data on RX. Any time it needs to stop VCU, it pulls down its RTS line at which time VCU sees its CTS to go low and stops data transmission toward UDI.

Six different handshakes are supported by the protocol and together suffice to conduct the entire information exchange between the two ends of the link. In the first handshake, the UDI inquires for patient data. The VCU answers by sending patient records. With the second handshake, the UDI inquires for image capture after identifying the CCD and video source type. The VCU performs the capture and answers by responding with a positive or negative acknowledgment record. In the third handshake, the UDI inquiries for VCU presence and the VCU answers that it is available. With the fourth handshake, the VCU inquiries for CCD and video source type. The UBI answers by identifying the CCD and video source type. In the fifth handshake, the UDI sends press-button status information to the VCU as a result of user action on the "V" or "C" buttons. In the sixth handshake, the VCU (or the computer) sends any of the command packets on its own initiative.

The liaison between VCU and UDI is performed over a serial line in compliance with RS232C specifications. The baud rate may be, for example, 1200. Characters are sent asynchronously with 1 start, 8 data, no parity, and 1 stop bits. Both the computer and the UDI act as DTE (data terminal equipment) type devices. Therefore, a "crossover" cable is used in order to establish the physical link between the devices. Thus, TX/RX and RTS/CTS are cross wired, DTR and DSR are also cross linked. CD and RI are not used.

Both devices raise the DTR signal when they are powered up and they check the presence of DTR in order to verify the on-line presence of the other device. Data transmission is conditioned by the CTS signal's presence at the transmitting end. The receiving party can lower its outgoing RTS line during reception in order to indicate to the other device that data transmission should stop as there is an overload condition at the receiving end. Once the receiving device is ready to resume reception, it reasserts the RTS line to let the transmitting device know that it can continue sending data.

D. MPS System Operation:

1. Basic System Operation

The following passage will explain exemplary procedures for entering data, capturing still images and video clips, and producing prints using the MPS system. Initially, the user should ensure that the MPS File Server 3, MPS workstation 1, video processor 5 and corresponding procedure monitor are all powered up. After the MPS system is powered up, a MPS Main Menu 84 will appear as illustrated in FIG. 15.

Prior to the execution of the medical procedure, the nurse or administrative clerk identifies to the MPS workstation 1 which will be assigned to the patient who is to be examined. Therefore, the MPS system knows the patient and procedure record with which all the data (visual and textual) collected during the examination should be associated. This procedure is performed from the Patient Data Management Module M2 (see FIG. 2) which is initiated from the "Patient Data Management" button 86 on the MPS Main Menu 84 (see FIG. 15).

Next, the user should view the Today's Rooms Schedule. This procedure can be initiated by selecting or clicking on the "Today's Room Schedule" button 88 provided on Main Menu 84 (see FIG. 15).

Figure 16:
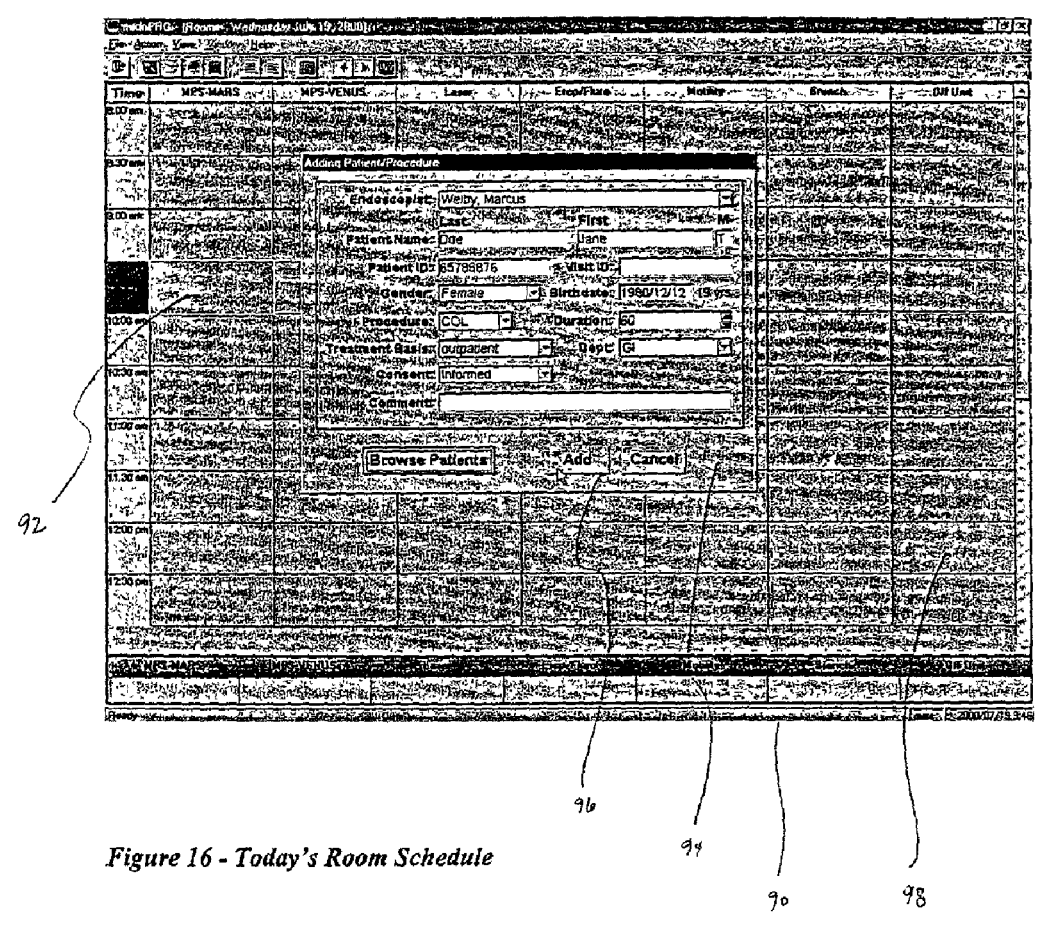

The "Today's Room Schedule" window 90 appears having a grid-like matrix 98 with rows representing time slots/blocks 92 and columns representing types of procedures/equipment available during the time slots. To start the scheduler, the user then clicks on the right hand button of the mouse on the required time slot for the room where the MPS workstation 1 is located, as illustrated in FIG. 16.

Next, an "Adding Patient/Procedure" window 94 appears when a time slot is selected from the schedule. The user is requested to enter the following procedure data: (1) the endoscopist name is selected from the drop down list of names; (2) the patient's last name and first name should be entered; (3) the patient identification number (this is optional, if not entered, the computer will generate a unique ID). Next, the user should select a procedure type from a drop down list of procedures. Furthermore, the user can enter the sex of the patient. When all entered information is correct, the user should click on the "Add" button 96. As a result, the patient's name and procedure details will appear on the schedule grid 98. To edit any details, the user can right click using the mouse on the procedure on the schedule grid 98.

At this point, the user is ready to start the procedure. The procedure can be initiated by right clicking the mouse button from the drop down list of procedures from the Today's Rooms Schedule screen 90. Next, the user should select "In Room" from the Today's Room Schedule Screen. The procedure data will appear on the procedure monitor in the operation room. Also, the MPS Main Screen will appear on the MPS workstation monitor as illustrated in FIG. 17. The monitor area on the MPS main screen will display a window 82 showing the same image as the procedure monitor.

During the procedure, motion pictures or video clips can be captured by pressing the "V" button 8 on the scope head to start the clip (see FIG. 25). Pressing the "V" button 8 a second time will stop the video clip. Statistics about the captured clip can be viewed on the status bar after video recording is completed. The last frame of the captured video clip will appear on the thumbnail bar 74, as shown in FIG. 18.

Still images can be captured by pressing the "C" button 10 on the scope head. When the image has been successfully stored, the message "CAPTURE OK" will appear on the procedure monitor. The captured images will also appear on the thumbnail bar 74 as illustrated in FIG. 18. When the procedure is complete, the user clicks on the Exit toolbar button. When the button is pressed, the "Today's Room Schedule" will re-appear. To signify a completed procedure, the color of the procedure on the schedule will change.

After the procedure is complete, images from any completed procedure can be reviewed. To do this, the user right clicks on the required procedure and selects Image Review to view images and video clips and also to print images. At this instance, all the captured images and video clips will appear on the thumbnail bar 74, as illustrated in FIG. 19. If there are more images than can be seen on the Thumbnail Image Bar 74 at one time, the remaining images can be seen by using the scroll controls on the image bar. Video clips will be marked with a video number and still images will be marked with an image number.

To view video clips, one right clicks the mouse over the required video clip on the thumbnail bar 74 and selects "Play". At that point, the Video Clip Viewer Screen will appear and the video will start playing as illustrated in FIG. 19. To pause the clip, the user should click on the "Pause" button. To restart the clip, the user click on the Play button. To capture a still image from a video clip, the user can clicks on the "Capture Still Frame" button 98. Captured still frames can be edited in the same ways as still images captured from the endoscope. When the user is finished with the video clip, the user can click on the "Close" button 100 to return to the MPS Main Screen (see FIG. 17).

Images can be selected for printing by right clicking the mouse over the required image on the thumbnail bar and choosing "Select". An image will appear in the print area which is in the center of the screen. In the embodiment being discussed, up to twelve images may be printed per command. As images are added to the print area the size of the images is adjusted to make the best use of the available space. If an image is selected by mistake, it can be deselected from the print area by right clicking the mouse over the image and selecting deselect.

To see how the print will appear with the selected images, the user can press a Print Preview button. When the Print Preview button is selected, a "Print Preview" window appears. To create prints, the user can press the Print button, select the required number of prints, and click on OK to start the printing process. To return to the previous screen, the user should press the cancel button.

2. Advanced Editing Techniques

The MPS system also provides alternate methods of selecting images. Still images can be selected for printing in three ways. The first method involves clicking the mouse on the image and then choosing "Select". The second method includes a drag and drop method. The user places the cursor over the image, holds down the left mouse button and moves the cursor to the location where the user wants to place the image. The cursor will change to point to the place where the image will be inserted if there are two or more images already selected in the image area. The third method is executed by a double click. With this method, the user holds the mouse still over the image and quickly clicks the left mouse button two times. Of course other methods are possible.

Adding text to still images can be accomplished by right clicking on the image and selecting "Annotation" whereupon the Annotation window 110 will appear. Also, as illustrated in FIG. 21, another pop-up window entitled "Annotation Text", appears which will show a list of findings and a list of locations. Any text can be typed in the text box. If a finding or location is required, then the user should click on the finding or location to select it. If both finding and location are chosen, the two will be shown separated by a comma, e.g. Blood, Cecum. The user then clicks on "OK" to accept the text or "Cancel" to go to the main Annotation window 108. If text was selected, the text can be dropped at the location of the pen cursor by clicking on the image. The cursor points to the top left corner of the text. To add more text, the user should then click on the "Text" tool button from the button on the left of the image.

Lines, ellipses, and rectangles, can be added to the image by clicking on one of the drawing tools from the buttons on the left of the image. The user should hold down the left mouse key to anchor on an end of the object, then move the mouse to the position for the other end of the object and release the mouse button.

Annotation objects must be selected before they can be edited. To do so, the user should click on the "Selection" tool from the annotation toolbox. The user then clicks on the object to be selected. As a result, the object will be highlighted. Lines, ellipses, and rectangles will have control handles. To select multiple objects, the user holds down the Ctrl key when clicking on each new object.

Any annotation object (i.e., text, line, ellipse, rectangle) can be dragged and dropped to another location on the image. The size of the drawing objects (lines, ellipses and rectangles) can be adjusted by selecting the object and then dragging the drawing object handles to the required size. Any annotation added to the image will be in the color currently selected in the object properties bar. The color of an object can be changed by selecting the object and changing the color in a Color Property box. Also, the width of the drawing objects can be changed by selecting the object and selecting a new width from a width property box. For text objects, the font, point size and color can be changed in the same way.

Images can be enhanced with the Image Enhancement and Optimization tools. Some tools use a slider under the image to change the properties of the image and others are applied automatically when the tool button is clicked. To optimize, the user automatically adjusts the contrast and brightness to produce a good balance of light and dark areas by clicking on a button that automatically applies the image optimization. A brightness control lightens or darkens the image. A contrast control changes the difference between the light and dark parts of an image. A sharpness control can be used to bring out detail in the image. To remove noise, a noise tool smooths the image where there is a small sharp change in brightness caused e.g., by noise or pinpoint reflections from air bubbles. Clicking on this button automatically applies the noise reduction. The color tool can individually adjust each of the three color channels red, green, and blue. To remove the enhancements, the user should right click the mouse over the image and select "Filters", then "Remove All Filters".

3. Operating the Specialty Video Player (SVP)

The following passage describes exemplary operation of the MPS Specialty Video Player (SVP). As illustrated in FIG. 21, the SVP looks like a traditional computer software based multi-media player. On the bottom left corner of the SVP window, the traditional playback controls are displayed in addition to SVP's special controls.

The first three buttons correspond to traditional-type Play 52, Pause 54, and Stop 56 functions of the player. These buttons are also referred to as Standard Playback Functions. The SVP also provides for reduced speed and accelerated speed playback of the video, otherwise referred to as Playback Speed Control. The playback rate is indicated in percentage from in a small box 36 at the top right hand side of the SVP window. It should be noted that FIG. 21 shows an embodiment which ranges from 25% to 200%, however, the range may vary. For instance, the range may vary from 25% to 1000%. The range can be adjusted as appropriate. For example, when a video playback rate is adjusted to 25%, the video is played back at one quarter of the real-time rate. As the real-time rate is 30 frames per second (fps), the minimum speed (in that embodiment) is 7.5 fps. At full acceleration, the playback is performed at ten times speed (i.e. 300 fps).

The 1000% ability is ideal for a scenario when the physician does not time-mark or index the entire video footage (e.g., a crisis situation during the procedure when time-marking loses all priority). Now, the situation requires the entire footage has to be manually reviewed. The 1000% rate allows one to review a 120 minute video in twelve minutes with a stable video. Then the video footage can be marked and indexed when a significant portion of the video is located.

To change the playback rate, three methods are available. The rate can be entered in the text window directly by typing on the keyboard. The indicator showing the playback rate can be dragged left for slower, and right for faster speed. The standard rates 25, 50, 100 and 200 (as illustrated in FIG. 21), can be achieved by clicking with the mouse on the numbers shown in the playback rate box.

While the playback is paused, the buttons designated with the symbols "<" 62 or ">" 64, otherwise referred to as "Frame per Frame Movement", allow for one frame at a time reverse or forward shift within the video clip. The purpose of this function is to pick a better image with less motion blur in the event a still image capture or replacement of the title frame is desired.

The buttons designated with the symbols "||<" 58 or "||>" 68, otherwise referred to as Second by Second Movement, provide one second at a time reverse or forward motion within the video clip. The purpose of these buttons 58, 68 is to manually "scan" the video to get to the exact location of the desired view once that view is within a few seconds of motion. The buttons designated with the symbols "<<" 60 or ">>" 66, otherwise referred to as "Jump to First and Last Frame Functions", permit rapid movement to the beginning and ending of the video clip. Buttons 70 and 72 allow the user to jump to the previous index marker or jump forward to the next index marker.

The SVP also provides a Slider 48, Index Zones (for example 42, 44, 46), Index Selector Window 38, and Index Data Box 39, as illustrated in FIG. 22. Dragging the Slider 48 left or right also performs movements within the body of the video clip. During playback, Slider 48 moves along a Time Line 40 at the playback speed selected. Slider 48 is paused while the video is paused. Slider 48 also qualitatively indicates the relative instance of the video clip which is currently being reviewed.

On the top left corner of the SVP window, there are eight buttons side by side as illustrated in FIG. 21. From left to right, the first button shows an exit door 20, and when selected, exits or closes the SVP window function. The following two buttons, referred to as "Capture Still Image" 22 and "Replace Title Frame" 24, respectively, are controls for still image capture during playback. Once the video playback is paused on the view which is desired to be captured, one of the two buttons could be pressed. The Capture Still Image button 22 will generate a still picture within the current medical procedure record. The Replace Title Frame button 24 will replace the title frame of the video clip being played back with the current view.

The next couple of software buttons, otherwise referred to as "Create" Marker 26 and "Delete" Marker 28, respectively, provide for the creation and deletion of a marker at the currently paused offset within the video clip. A marker is usually created to indicate that there is something interesting to view at that moment within the video clip. Each marker is automatically associated with an index entry in the database, and also provided with an Index Zone, which is a certain amount of time which starts prior to the marker and ends past the marker. The duration of the Index Zone is set by default but can be overwritten by the user. A marker can also be created by pressing the "C" button 10 of the video endoscope during the medical examination. By doing so, a still frame is also captured immediately, and a label is affixed to the time line. If the marker is created during playback using the software button, no label is set on the Time Line 40 other than the standard Index Zone.

The finding and location fields are fed with data coming off standard lookup tables (as can be provided by Pentax ENDOPRO software). The comment field 140 is for free text entry. It is equally searchable using the database management tools. Also, two buttons 30, 32 (from FIG. 21) are provided for the copy of one or all-video clips respectively into individual video files. Button 30 copies only the video clip associated with the Index Zone currently highlighted. Button 32 does the same for all video clips associated with all Index Zones. Another button 34 is also provided that allows for the automatic concatenation of all video clips into the "Executive Summary Video Procedure", as discussed earlier in the specification.

FIG. 22 also illustrates the Time Line of the SVP. Underneath, three Index Zones are identified in a highlighted color. The first Index Zone indicates that the view currently displayed corresponds to that time interval. Note that when the slider is within the first Index Zone 42, the Index Selector indicates "Index 1-Bleeding", and the Index Data Box 39 on the right hand side shows the finding, location and comment files of the index record.

The Index Zone (for example 42, 44, 46) corresponding to a marker can be expanded or reduced by dragging the starting and ending extremities of the Index Zone Line. While the playback is paused within an Index Zone, an Index Entry 134 from the Index Selector drop down box 132 can be chosen for association with regard to the current Index Zone, as illustrated in FIG. 23.

If the Index Selector does not have the appropriate Index Entry 134 already created, a new Index Entry 134 can be created by clicking on the button 136 immediately to the right of the selector. By doing so, the Index Table Management Window (or Edit Index List), as illustrated in FIG. 24, is brought up. In its top portion 138, all the existing index entries are shown. One of them is highlighted, e.g., in blue. The Index Entry highlighted is further detailed in the lower section of the window. Namely, its title, the finding, the location of the finding, and the comments of the physician regarding this entry are displayed and can be edited. This window also permits the creation of new Index entries. It is important to understand that an Index Entry can be associated with several Index Zones. Each Index Record is made of four components or data fields including Title text, Finding, Location, and free text. The title text can be created automatically if the "Use finding and Location as Title" box is checked.

One feature of the indexing system is that it can actually be representative of multiple still images or video footage for one area of concern. For instance, it is not uncommon for a physician, while approaching a significant discovery, to move the probe back and forth around the area/point of interest to verify that the best perspective of the medical condition has been observed. Thus, the same area can be re-examined a series of times throughout the entire procedure. Also, the same malignancy could be examined as the probe is being inserted and while the probe is being removed from the patient. In other words, while entering the patient's body a malignancy could be discovered four minutes into the procedure and at the end of the procedure, perhaps twenty three minutes later, as the endoscope is being removed, the physician will capture more footage of the same malignancy. Yet since it is the same malignancy, it truly is not appropriate to label both sets of images or video clips as two different findings.

Whenever there are multiple images or video footage for the same finding, the MPS system allows for one index to be created for that same finding. Thus, it is appropriate to only associate one index for one finding no matter how many different shots have been taken or no matter when the series of vantage points were taken during the procedure. This approach then actually could provide multiple images or video clips for one significant finding. Therefore, the MPS system allows multiple images and or video clips to share the same index, which in turn reduces the possibility of confusion during the review of the entire procedure.

For example, if three malignancies are discovered during a procedure, and the physician records footage while entering the body canal and while egressing the same, it is possible that confusion could occur when the clip is reviewed. It is possible that the footage could be interpreted as having six different malignancies, when it truly had only three. Thus, the above-noted feature allows the same indexes to be used twice for the first, second, and third malignancy. With this feature, it is much easier to keep track of the entire procedure and it also reduces the possibility of errors or misinterpretation of the video clip when reviewed later on.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to E-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, PPP, FTP), and peripheral control (IrDA; RS232C; USB; ISA; ExCA) represent examples of the state of the art. Such standards are periodically superseded by faster or more efficient equivalents having essentially the same functions. Accordingly, replacement standards and protocols having the same functions are considered equivalents.

What is claimed:

1. A computer readable medium storing a computer program that provides a computer-based video recording and management system for medical procedures, the medium comprising:
    an inserting code segment that inserts at least one time-mark into video upon receiving input from a user, the at least one time-mark capable of being inserted into the video real-time during a medical procedure while the video is being recorded and post procedure;
    an associating code segment that associates an index with the at least one time-mark, data capable of being input into the index real-time during a medical procedure and post procedure; and
    an extracting code segment that extracts at least one portion of the video starting at a predetermined period of time before the at least one time-mark and ending at a predetermined period of time after the at least one time-mark.

2. The medium according to claim 1, wherein the index comprises data for at least one of a patient's name, medical finding, finding location, and free text.

3. The medium according to claim 2, wherein the data is transmitted from at least one of a medical instrument, microphone, footpedal/switch, mouse and computer keyboard operated by a user of the system.

4. The medium according to claim 1, wherein the at least one portion of video is concatenated with at least another portion of video into a shortened summary video clip.

5. A computer readable medium storing a computer program that enables recording and time-marking of significant events during a medical procedure in video, indexing patient data with the video, and editing and accessing the video with patient data and diagnostic information from a database, the medium comprising:
    an inserting code segment that inserts at least one time-mark into the video, the at least one time-mark capable of being inserted into the video real-time during the medical procedure while the video is being recorded and post procedure;
    an associating code segment that associates an index with the at least one time-mark;
    an extracting code segment that extracts at least one portion of the video at the at least one time-mark, wherein the at least one portion begins before the at least one time-mark and ends after the at least one time-mark;
    a concatenating code segment that concatenates the extracted at least one portion of video together with at least another portion of video into a shortened summary video clip; and
    a storing code segment that stores, both the video and shortened summary video clip with associated indices, into a searchable database.

6. The medium according to claim 5, further comprising a an updating code segment that maintains and updates at least one patient's medical record with at least one of data from the index, video, and still images from the medical procedure.

7. The computer readable medium according to claim 5, wherein the index comprises data fields for at least one of a name, medical finding, finding location, and free text.

8. The computer readable medium according to claim 7, wherein data for the index is capable of being input real-time during the medical procedure and post-procedure.

9. The computer readable medium according to claim 5, wherein the time-mark is inserted according to a user input.

10. The computer readable medium according to claim 5, further comprising a notifying code segment that notifies whether the insertion of the at least one time-mark was successful or failed, by displaying a message on a monitor.

11. The computer readable medium according to claim 5, further comprising a player providing code segment that provides a specialty video player.

12. The computer readable medium according to claim 11, wherein the specialty video player includes a playback speed control which provides for playback speeds ranging from a reduced speed to an accelerated speed as compared to a normal speed.

13. The computer readable medium according to claim 11, further comprising an enabling code segment that enables jumping backward to a previous time-mark or jumping forward to a next time-mark.

14. The computer readable medium according to claim 11, further comprising a still image capturing code segment that provides a capture still image feature which stores a still image within at least one patient's medical record.

15. The computer readable medium according to claim 11, further comprising a marker code segment that provides a create marker and delete marker feature which allows for the creation and deletion of the at least one time-marker within the video.

16. The computer readable medium according to claim 5, further comprising a voice data entry code segment which provides a voice activated data entry system allowing data to be entered via voice.

17. A computer-based video recording and management system, used in conjunction with medical diagnostic equipment, which allows recording and time-marking of events during a medical procedure on video, indexing patient data with the video, and editing or accessing the video with patient data from a database, the system comprising:

at least one input device that inserts at least one time-mark into the video, the at least one time-mark capable of being inserted into the video real-time during the medical procedure while the video is being recorded and post procedure; and at least one workstation that associates an index with each time-mark, extracts at least a portion of the video at the at least one time-mark beginning before and ending after the at least one time-mark, concatenates the at least one portion of the video with at least another portion of video into a shortened summary video clip, and stores both the video and summary video clip into a searchable database.

18. The system according to claim 17, in which the at least one input device comprises a medical instrument having a video source, the video source being connected to the at least one workstation.

19. The system according to claim 18, wherein the medical instrument comprises an endoscope.

20. The system according to claim 18, wherein the medical instrument comprises one of an ultrasound device, flouroscopy device, x-ray device and surgical camera.

21. The system according to claim 17, wherein the at least one workstation maintains at least one patient's medical record.

22. The system according to claim 17, wherein the index comprises data fields for at least one of a name, medical finding, finding location, and free text.

23. The system according to claim 22, wherein data for the index is capable of being input real-time during a medical procedure and post-procedure during review.

24. The system according to claim 17, wherein the at least one workstation is connected to a network.

25. The system according to claim 24, wherein the at least one workstation is connected to the network via an Internet connection.

26. The system according to claim 24, further comprising at least one file server having a video storage array connected to the network which stores at least one patient's medical record.

27. The system according to claim 26, wherein the database is located in one of the at least one workstation and the at least one file server.

28. The system according to claim 24, wherein the network comprises a peer-to-peer network.

29. The system according to claim 17, wherein the input device comprises a foot pedal/switch, microphone, mouse, and computer keyboard.

30. The system according to claim 17, wherein when the input device is activated, the system encapsulates data with the video for indexing purposes.

* * * * *